United States Patent
Dutta

(10) Patent No.: US 12,314,719 B2
(45) Date of Patent: May 27, 2025

(54) MULTI-INDEXED MICRO-OPERATIONS CACHE FOR A PROCESSOR

(71) Applicant: NOKIA SOLUTIONS AND NETWORKS OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 96 days.

(21) Appl. No.: 17/704,131

(22) Filed: Mar. 25, 2022

(65) Prior Publication Data

US 2023/0305847 A1    Sep. 28, 2023

(51) Int. Cl.
*G06F 12/0875* (2016.01)
*G06F 9/26* (2006.01)
*G06F 9/30* (2018.01)

(52) U.S. Cl.
CPC .......... *G06F 9/30145* (2013.01); *G06F 9/262* (2013.01); *G06F 9/30043* (2013.01); *G06F 9/30047* (2013.01); *G06F 12/0875* (2013.01); *G06F 2212/453* (2013.01)

(58) Field of Classification Search
CPC ............. G06F 12/0875; G06F 12/0893; G06F 12/0895; G06F 12/0864; G06F 2212/452; G06F 2212/453
See application file for complete search history.

(56) References Cited

U.S. PATENT DOCUMENTS

| | | | |
|---|---|---|---|
| 10,606,599 B2 * | 3/2020 | Suggs | G06F 9/3808 |
| 2003/0009620 A1 | 1/2003 | Solomon et al. | |
| 2009/0249036 A1 | 10/2009 | Rappoport et al. | |
| 2018/0165096 A1 * | 6/2018 | Suggs | G06F 12/0855 |
| 2019/0188142 A1 | 6/2019 | Rappoport et al. | |
| 2020/0019406 A1 * | 1/2020 | Kalamatianos | G06F 9/30145 |
| 2020/0110610 A1 * | 4/2020 | Lapeyre | G06F 12/0875 |
| 2020/0285466 A1 * | 9/2020 | Kotra | G06F 9/223 |
| 2021/0279054 A1 | 9/2021 | Kotra et al. | |

OTHER PUBLICATIONS

Kotra, J.B. and Kalamatianos, J., Oct. 2020. Improving the utilization of micro-operation caches in x86 processors. In 2020 53rd Annual IEEE/ACM International Symposium on Microarchitecture (Micro) (pp. 160-172). IEEE.*
Solomon, B., Mendelson, A., Orenstein, D., Almog, Y. and Ronen, R., Aug. 2001. Micro-operation cache: a power aware frontend for the variable instruction length isa. In Proceedings of the 2001 international symposium on Low power electronics and design (pp. 4-9).*

(Continued)

*Primary Examiner* — Tracy A Warren
(74) *Attorney, Agent, or Firm* — Tong, Rea, Bentley & Kim, LLC

(57) ABSTRACT

Various example embodiments for supporting a multi-indexed micro-operations cache (MI-UC) in a processor are presented. Various example embodiments for supporting an MI-UC in a processor may be configured to support an MI-UC in which, for a UC line of the MI-UC, multiple indexes into the UC line, for multiple sets of micro-operations (UOPs) stored in the UC line based on decoding of multiple instructions, are supported.

16 Claims, 20 Drawing Sheets

(56) References Cited

OTHER PUBLICATIONS

Kim, Joonsung, Hamin Jang, Hunjun Lee, Seungho Lee, and Jangwoo Kim. "UC-check: Characterizing micro-operation caches in x86 processors and implications in security and performance." In Micro-54: 54th Annual IEEE/ACM International Symposium on Microarchitecture, pp. 550-564. 2021.*

Extended EP Search Report, Application No. 23157825.3, Jul. 18, 2023, 8 pages.

* cited by examiner

INSTRUCTION CACHE
400

INSTRUCTION POINTER
500

PROGRAM 600

Instr_1
Instr_2
Instr_3
jump_100
Instr_4
Instr_5
.....
....
Instr_25
Instr_26
Instr_27
jump_102
Instr_28
Instr_29
...
...
Instr_100
Instr_101
Instr_102
Instr_103
Instr_104
Instr_105
jump_25
Instr_106
Instr_107
....
.....
Instr_200
Instr_201
jump_103
Instr_202
Instr_203
Instr_204

*FIG. 7A*

IC LINE 1

| Identifier: IP of Instr_1 |
|---|
| Instr_1 |
| Instr_2 |
| Instr_3 |
| jump_100 |
| instr_4 |
| instr_5 |

*FIG. 7B*

IC LINE 2

| Identifier: IP of Instr_100 |
|---|
| Instr_100 |
| Instr_101 |
| Instr_102 |
| Instr_103 |
| Instr_104 |
| Instr_105 |
| jump_25 |
| Instr_106 |
| Instr_107 |

*FIG. 7C*

IC LINE 3

| Identifier: IP of Instr_25 |
|---|
| Instr_25 |
| Instr_26 |
| Instr_27 |
| jump_102 |
| Instr_28 |
| Instr_29 |

*FIG. 10A*

UC LINE 1

| Identifier: IP of Instr_1 |
|---|
| UOP(s) of Instr_1 |
| UOP(s) of Instr_2 |
| UOP(s) of Instr_3 |
| UOP(s) of jump_100 |

*FIG. 10B*

UC LINE 2

| Identifier: IP of Instr_100 |
|---|
| UOP(s) of Instr_100 |
| UOP(s) of Instr_101 |
| UOP(s) of Instr_102 |
| UOP(s) of Instr_103 |

*FIG. 10C*

UC LINE 3

| Identifier: IP of Instr_104 |
|---|
| UOP(s) of Instr_104 |
| UOP(s) of Instr_105 |
| UOP(s) of jump_25 |

*FIG. 10D*

UC LINE 4

| Identifier: IP of Instr_25 |
|---|
| UOP(s) of Instr_25 |
| UOP(s) of Instr_26 |
| UOP(s) of Instr_27 |
| UOP(s) of jump_102 |

*FIG. 10E*

UC LINE 5

| Identifier: IP of Instr_102 |
| --- |
| UOP(s) of Instr_102 |
| UOP(s) of Instr_103 |
| UOP(s) of Instr_104 |
| UOP(s) of Instr_105 |
| UOP(s) of jump_25 |

*FIG. 10F*

UC LINE 6

| Identifier: IP of Instr_200 |
| --- |
| UOP(s) of Instr_200 |
| UOP(s) of Instr_201 |
| UOP(s) of jump_103 |

*FIG. 10G*

UC LINE 7

| Identifier: IP of Instr_103 |
| --- |
| UOP(s) of Instr_103 |
| UOP(s) of Instr_104 |
| UOP(s) of Instr_105 |
| UOP(s) of jump_25 |

FIG. 12A

UC LINE 1 

| |
|---|
| Identifier: IP of Instr_1 |
| Intermediate entry 1: {IP Instr_2, offset of 1$^{st}$ UOP of Instr 2} |
| Intermediate entry 2: {IP Instr_3, offset of 1$^{st}$ UOP of Instr 3} |
| Intermediate entry 3: {IP jump_100, offset of 1$^{st}$ UOP of jump_100} |
| UOP(s) of Instr_1 |
| UOP(s) of Instr_2 |
| UOP(s) of Instr_3 |
| UOP(s) of jump_100 |

FIG. 12B

UC LINE 2 

| |
|---|
| Identifier: IP of Instr_100 |
| Intermediate entry 1: {IP Instr_101, offset of 1$^{st}$ UOP of Instr 101} |
| Intermediate entry 2: {IP Instr_102, offset of 1$^{st}$ UOP of Instr 102} |
| Intermediate entry 3: {IP Instr_103, offset of 1$^{st}$ UOP of Instr_103} |
| UOP(s) of Instr_100 |
| UOP(s) of Instr_101 |
| UOP(s) of Instr_102 |
| UOP(s) of Instr_103 |

FIG. 12C

UC LINE 3

| |
|---|
| Identifier: IP of Instr_104 |
| Intermediate entry 1: {IP Instr_105, offset of 1$^{st}$ UOP of Instr_105} |
| Intermediate entry 2: {IP jump_25, offset of 1$^{st}$ UOP of jump_25} |
| UOP(s) of Instr_104 |
| UOP(s) of Instr_105 |
| UOP(s) of jump_25 |

FIG. 12D

UC LINE 4

| |
|---|
| Identifier: IP of Instr_25 |
| Intermediate entry 1: {IP Instr_26, offset of 1$^{st}$ UOP of Instr_26} |
| Intermediate entry 2: {IP Instr_27, offset of 1$^{st}$ UOP of Instr_27} |
| Intermediate entry 3: {IP jump_102, offset of 1$^{st}$ UOP of jump_102} |
| UOP(s) of Instr_25 |
| UOP(s) of Instr_26 |
| UOP(s) of Instr_27 |
| UOP(s) of jump_102 |

FIG. 12E

UC LINE 5

| |
|---|
| Identifier: IP of Instr_200 |
| Intermediate entry 1: {IP Instr_201, offset of 1$^{st}$ UOP of Instr_201} |
| Intermediate entry 2: {IP jump_103, offset of 1$^{st}$ UOP of jump_103} |
| UOP(s) of Instr_200 |
| UOP(s) of Instr_201 |
| UOP(s) of jump_103 |

MULTI-INDEXED MICRO-OPERATIONS CACHE FOR A PROCESSOR

TECHNICAL FIELD

Various example embodiments relate generally to computer systems and, more particularly but not exclusively, to processors of computer systems.

BACKGROUND

Computer systems utilize various types of processors to perform various functions in various contexts.

SUMMARY

In at least some example embodiments, an apparatus includes a decode unit and a micro-operations cache, wherein the decode unit is configured to decode a first instruction into a first set of micro-operations and a second instruction into a second set of micro-operations, wherein the micro-operations cache is configured to store, in a cache line of the micro-operations cache, the first set of micro-operations and the second set of micro-operations and store, for the cache line of the micro-operations cache, an identifier of the first instruction and an entry for the second instruction, wherein the entry for the second instruction includes an identifier of the second instruction and an indication of a location of the second set of micro-operations in the cache line of the micro-operations cache. In at least some example embodiments, the identifier of the first instruction, the identifier of the second instruction, and the indication of the location of the second set of micro-operations in the cache line of the micro-operations cache are stored in the cache line of the micro-operations cache. In at least some example embodiments, the identifier of the first instruction, the identifier of the second instruction, and the indication of the location of the second set of micro-operations in the cache line of the micro-operations cache are stored as part of a set of metadata stored in the cache line of the micro-operations cache. In at least some example embodiments, the identifier of the first instruction is based on a combination of an IP-Tag of the first instruction and an IP-Offset of the first instruction. In at least some example embodiments, the identifier of the second instruction is based on a combination of an IP-Tag of the first instruction and an IP-Offset of the second instruction. In at least some example embodiments, the IP-Offset of the second instruction and the indication of the location of the second set of micro-operations in the cache line of the micro-operations cache are stored as a tuple in the cache line of the micro-operations cache. In at least some example embodiments, the indication of the location of the second set of micro-operations in the cache line of the micro-operations cache includes an offset, from a beginning of a first micro-operation in the first set of micro-operations, to a first micro-operation in the second set of micro-operations. In at least some example embodiments, the first set of micro-operations and the second set of micro-operations are stored in a data array entry of a data array of the micro-operations cache. In at least some example embodiments, the identifier of the first instruction, the identifier of the second instruction, and the indication of the location of the second set of micro-operations in the cache line of the micro-operations cache are stored in a tag array entry of a tag array of the micro-operations cache. In at least some example embodiments, based on decoding of the second instruction and storage of the second set of micro-operations as intermediate micro-operations in the cache line of the micro-operations cache, the identifier of the second instruction and the indication of the location of the second set of micro-operations in the cache line of the micro-operations cache are stored in a next empty intermediate entry within a tag array entry for the second instruction in a tag array of the micro-operations cache. In at least some example embodiments, based on a determination that a lookup of the identifier of the second instruction in a tag array entry of a tag array of the micro-operations cache does not match an identifier of the tag array entry but is within range of a set of intermediate entries of the tag array entry, an offset portion of the identifier of the second instruction is looked up among the set of intermediate entries of the tag array entry to identify one of the intermediate entries of the tag array entry storing the indication of the location of the second set of micro-operations in the cache line of the micro-operations cache. In at least some example embodiments, based on identification of the one of the intermediate entries of the tag array entry storing the indication of the location of the second set of micro-operations in the cache line of the micro-operations cache, the second set of micro-operations is retrieved from the cache line of the micro-operations cache based on the indication of the location of the second set of micro-operations in the cache line of the micro-operations cache and the second set of micro-operations is provided to an execution unit. In at least some example embodiments, the micro-operations cache is configured to compare the identifier of the second instruction with an identifier of a tag array entry of a tag array, perform, based on a determination that the identifier of the second instruction and the identifier of the tag array entry do not match but that the identifier of the second instruction is within range of a set of intermediate entries of the tag array entry, a lookup of an offset portion of the identifier of the second instruction in each of the intermediate entries of the tag array entry in parallel, and provide, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the micro-operations cache is configured to compare the identifier of the second instruction with an identifier of a tag array entry of a tag array and compare an offset portion of the identifier of the second instruction against a set of intermediate entries of the tag array entry in parallel and provide, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the micro-operations cache is configured to select, by an address decoder of a data array including a set of ways, each of the ways corresponding to the identifier of the second instruction and perform, on each of the selected ways in a tag array, a respective set of operations for attempting to retrieve the indication of the location of the second set of micro-operations in the cache line of the micro-operations cache from the respective way in the tag array. In at least some example embodiments, to perform the respective set of operations for attempting to retrieve the indication of the location of the second set of micro-operations in the cache line of the micro-operations cache from the respective way in the tag array, the micro-operations cache is configured to compare the identifier of the second instruction against an identifier of the respective way in the tag array, determine, based on a determination that the identifier of the second instruction does not match the identifier of the respective way in the tag array, whether a condition for the respective way of the tag array is satisfied, wherein the condition for the respective way of the tag array is that the identifier of the second instruction is greater than the identifier of the respective way in the tag array but less than a sum of the identifier of the respective way in the tag array and a size of the respective way in the tag array, compare, based on a determination that the condition for the respective way of the tag array is satisfied, an offset portion of the identifier of the second instruction against a set of intermediate entries of the tag array in parallel, and provide, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, to perform the respective set of operations for attempting to retrieve the indication of the location of the second set of micro-operations in the cache line of the micro-operations cache from the respective way in the tag array, the micro-operations cache is configured to compare, in parallel, the identifier of the second instruction against an identifier of the respective way in the tag array and an offset portion of the identifier of the second instruction against a set of intermediate entries of the tag array in parallel and provide, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the micro-operations cache is configured to provide, by the tag array based on a determination that the identifier of the second instruction is a hit in the micro-operations cache, a way number of one of the ways with which the second instruction is associated and the indication of the location of the second set of micro-operations in the cache line of the micro-operations cache and provide, by the data array, data from a set of micro-operations lines in the one of the ways to a way multiplexer. In at least some example embodiments, the micro-operations cache is configured to provide the way number of the one of the ways with which the second instruction is associated as an input into the way multiplexer and select, by the way multiplexer from the set of micro-operations lines in the one of the ways based on the way number, data from the cache line of the micro-operations cache. In at least some example embodiments, the micro-operations cache is configured to provide, to an aligner, the data from the cache line of the micro-operations cache and the indication of the location of the second set of micro-operations in the cache line of the micro-operations cache and read, by the aligner from the data from the cache line of the micro-operations cache based on the indication of the location of the second set of micro-operations in the cache line of the micro-operations cache, the second set of micro-operations.

In at least some example embodiments, a non-transitory computer-readable medium stores computer program code configured to cause an apparatus to decode, by a decode unit, a first instruction into a first set of micro-operations and a second instruction into a second set of micro-operations, store, by a micro-operations cache in a cache line of the micro-operations cache, the first set of micro-operations and the second set of micro-operations, and store, by the first micro-operations cache for the cache line of the micro-operations cache, an identifier of the first instruction and an entry for the second instruction, wherein the entry for the second instruction includes an identifier of the second instruction and an indication of a location of the second set of micro-operations in the cache line of the micro-operations cache. In at least some example embodiments, the identifier of the first instruction, the identifier of the second instruction, and the indication of the location of the second set of micro-operations in the cache line of the micro-operations cache are stored in the cache line of the micro-operations cache. In at least some example embodiments, the identifier of the first instruction, the identifier of the second instruction, and the indication of the location of the second set of micro-operations in the cache line of the micro-operations cache are stored as part of a set of metadata stored in the cache line of the micro-operations cache. In at least some example embodiments, the identifier of the first instruction is based on a combination of an IP-Tag of the first instruction and an IP-Offset of the first instruction. In at least some example embodiments, the identifier of the second instruction is based on a combination of an IP-Tag of the first instruction and an IP-Offset of the second instruction. In at least some example embodiments, the IP-Offset of the second instruction and the indication of the location of the second set of micro-operations in the cache line of the micro-operations cache are stored as a tuple in the cache line of the micro-operations cache. In at least some example embodiments, the indication of the location of the second set of micro-operations in the cache line of the micro-operations cache includes an offset, from a beginning of a first micro-operation in the first set of micro-operations, to a first micro-operation in the second set of micro-operations. In at least some example embodiments, the first set of micro-operations and the second set of micro-operations are stored in a data array entry of a data array of the micro-operations cache. In at least some example embodiments, the identifier of the first instruction, the identifier of the second instruction, and the indication of the location of the second set of micro-operations in the cache line of the micro-operations cache are stored in a tag array entry of a tag array of the micro-operations cache. In at least some example embodiments, based on decoding of the second instruction and storage of the second set of micro-operations as intermediate micro-operations in the cache line of the micro-operations cache, the identifier of the second instruction and the indication of the location of the second set of micro-operations in the cache line of the micro-operations cache are stored in a next empty intermediate entry within a tag array entry for the second instruction in a tag array of the micro-operations cache. In at least some example embodiments, based on a determination that a lookup of the identifier of the second instruction in a tag array entry of a tag array of the micro-operations cache does not match an identifier of the tag array entry but is within range of a set of intermediate entries of the tag array entry, an offset portion of the identifier of the second instruction is looked up among the set of intermediate entries of the tag array entry to identify one of the intermediate entries of the tag array entry storing the indication of the location of the second set of micro-operations in the cache line of the micro-operations cache. In at least some example embodiments, based on identification of the one of the intermediate entries of the tag array entry storing the indication of the location of the second set of micro-operations in the cache line of the micro-operations cache, the second set of micro-operations is retrieved from the cache line of the micro-operations cache based on the indication of the location of the second set of micro-operations in the cache line of the micro-operations cache and the second set of micro-operations is provided to an execution unit. In at least some example embodiments, the computer program code is configured to cause the micro-operations cache to compare the identifier of the second instruction with an identifier of a tag array entry of a tag array, perform, based on a determination that the identifier of the second instruction and the identifier of the tag array entry do not match but that the identifier of the second instruction is within range of a set of intermediate entries of the tag array entry, a lookup of an offset portion of the identifier of the second instruction in each of the intermediate entries of the tag array entry in parallel, and provide, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the computer program code is configured to cause the micro-operations cache to compare the identifier of the second instruction with an identifier of a tag array entry of a tag array and compare an offset portion of the identifier of the second instruction against a set of intermediate entries of the tag array entry in parallel and provide, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the computer program code is configured to cause the micro-operations cache to select, by an address decoder of a data array including a set of ways, each of the ways corresponding to the identifier of the second instruction and perform, on each of the selected ways in a tag array, a respective set of operations for attempting to retrieve the indication of the location of the second set of micro-operations in the cache line of the micro-operations cache from the respective way in the tag array. In at least some example embodiments, to perform the respective set of operations for attempting to retrieve the indication of the location of the second set of micro-operations in the cache line of the micro-operations cache from the respective way in the tag array, the computer program code is configured to cause the micro-operations cache to compare the identifier of the second instruction against an identifier of the respective way in the tag array, determine, based on a determination that the identifier of the second instruction does not match the identifier of the respective way in the tag array, whether a condition for the respective way of the tag array is satisfied, wherein the condition for the respective way of the tag array is that the identifier of the second instruction is greater than the identifier of the respective way in the tag array but less than a sum of the identifier of the respective way in the tag array and a size of the respective way in the tag array, compare, based on a determination that the condition for the respective way of the tag array is satisfied, an offset portion of the identifier of the second instruction against a set of intermediate entries of the tag array in parallel, and provide, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, to perform the respective set of operations for attempting to retrieve the indication of the location of the second set of micro-operations in the cache line of the micro-operations cache from the respective way in the tag array, the computer program code is configured to cause the micro-operations cache to compare, in parallel, the identifier of the second instruction against an identifier of the respective way in the tag array and an offset portion of the identifier of the second instruction against a set of intermediate entries of the tag array in parallel and provide, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the computer program code is configured to cause the micro-operations cache to provide, by the tag array based on a determination that the identifier of the second instruction is a hit in the micro-operations cache, a way number of one of the ways with which the second instruction is associated and the indication of the location of the second set of micro-operations in the cache line of the micro-operations cache and provide, by the data array, data from a set of micro-operations lines in the one of the ways to a way multiplexer. In at least some example embodiments, the computer program code is configured to cause the micro-operations cache to provide the way number of the one of the ways with which the second instruction is associated as an input into the way multiplexer and select, by the way multiplexer from the set of micro-operations lines in the one of the ways based on the way number, data from the cache line of the micro-operations cache. In at least some example embodiments, the computer program code is configured to cause the micro-operations cache to provide, to an aligner, the data from the cache line of the micro-operations cache and the indication of the location of the second set of micro-operations in the cache line of the micro-operations cache and read, by the aligner from the data from the cache line of the micro-operations cache based on the indication of the location of the second set of micro-operations in the cache line of the micro-operations cache, the second set of micro-operations.

In at least some example embodiments, a method includes decoding, by a decode unit, a first instruction into a first set of micro-operations and a second instruction into a second set of micro-operations, storing, by a micro-operations cache in a cache line of the micro-operations cache, the first set of micro-operations and the second set of micro-operations, and storing, by the first micro-operations cache for the cache line of the micro-operations cache, an identifier of the first instruction and an entry for the second instruction, wherein the entry for the second instruction includes an identifier of the second instruction and an indication of a location of the second set of micro-operations in the cache line of the micro-operations cache. In at least some example embodiments, the identifier of the first instruction, the identifier of the second instruction, and the indication of the location of the second set of micro-operations in the cache line of the micro-operations cache are stored in the cache line of the micro-operations cache. In at least some example embodiments, the identifier of the first instruction, the identifier of the second instruction, and the indication of the location of the second set of micro-operations in the cache line of the micro-operations cache are stored as part of a set of metadata stored in the cache line of the micro-operations cache. In at least some example embodiments, the identifier of the first instruction is based on a combination of an IP-Tag of the first instruction and an IP-Offset of the first instruction. In at least some example embodiments, the identifier of the second instruction is based on a combination of an IP-Tag of the first instruction and an IP-Offset of the second instruction. In at least some example embodiments, the IP-Offset of the second instruction and the indication of the location of the second set of micro-operations in the cache line of the micro-operations cache are stored as a tuple in the cache line of the micro-operations cache. In at least some example embodiments, the indication of the location of the second set of micro-operations in the cache line of the micro-operations cache includes an offset, from a beginning of a first micro-operation in the first set of micro-operations, to a first micro-operation in the second set of micro-operations. In at least some example embodiments, the first set of micro-operations and the second set of micro-operations are stored in a data array entry of a data array of the micro-operations cache. In at least some example embodiments, the identifier of the first instruction, the identifier of the second instruction, and the indication of the location of the second set of micro-operations in the cache line of the micro-operations cache are stored in a tag array entry of a tag array of the micro-operations cache. In at least some example embodiments, based on decoding of the second instruction and storage of the second set of micro-operations as intermediate micro-operations in the cache line of the micro-operations cache, the identifier of the second instruction and the indication of the location of the second set of micro-operations in the cache line of the micro-operations cache are stored in a next empty intermediate entry within a tag array entry for the second instruction in a tag array of the micro-operations cache. In at least some example embodiments, based on a determination that a lookup of the identifier of the second instruction in a tag array entry of a tag array of the micro-operations cache does not match an identifier of the tag array entry but is within range of a set of intermediate entries of the tag array entry, an offset portion of the identifier of the second instruction is looked up among the set of intermediate entries of the tag array entry to identify one of the intermediate entries of the tag array entry storing the indication of the location of the second set of micro-operations in the cache line of the micro-operations cache. In at least some example embodiments, based on identification of the one of the intermediate entries of the tag array entry storing the indication of the location of the second set of micro-operations in the cache line of the micro-operations cache, the second set of micro-operations is retrieved from the cache line of the micro-operations cache based on the indication of the location of the second set of micro-operations in the cache line of the micro-operations cache and the second set of micro-operations is provided to an execution unit. In at least some example embodiments, the method includes performing, by the micro-operations cache, comparing the identifier of the second instruction with an identifier of a tag array entry of a tag array, performing, based on a determination that the identifier of the second instruction and the identifier of the tag array entry do not match but that the identifier of the second instruction is within range of a set of intermediate entries of the tag array entry, a lookup of an offset portion of the identifier of the second instruction in each of the intermediate entries of the tag array entry in parallel, and providing, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the method includes performing, by the micro-operations cache, comparing the identifier of the second instruction with an identifier of a tag array entry of a tag array and comparing an offset portion of the identifier of the second instruction against a set of intermediate entries of the tag array entry in parallel and providing, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the method includes performing, by the micro-operations cache, selecting, by an address decoder of a data array including a set of ways, each of the ways corresponding to the identifier of the second instruction and performing, on each of the selected ways in a tag array, a respective set of operations for attempting to retrieve the indication of the location of the second set of micro-operations in the cache line of the micro-operations cache from the respective way in the tag array. In at least some example embodiments, to perform the respective set of operations for attempting to retrieve the indication of the location of the second set of micro-operations in the cache line of the micro-operations cache from the respective way in the tag array, the method includes performing, by the micro-operations cache, comparing the identifier of the second instruction against an identifier of the respective way in the tag array, determining, based on a determination that the identifier of the second instruction does not match the identifier of the respective way in the tag array, whether a condition for the respective way of the tag array is satisfied, wherein the condition for the respective way of the tag array is that the identifier of the second instruction is greater than the identifier of the respective way in the tag array but less than a sum of the identifier of the respective way in the tag array and a size of the respective way in the tag array, comparing, based on a determination that the condition for the respective way of the tag array is satisfied, an offset portion of the identifier of the second instruction against a set of intermediate entries of the tag array in parallel, and providing, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, to perform the respective set of operations for attempting to retrieve the indication of the location of the second set of micro-operations in the cache line of the micro-operations cache from the respective way in the tag array, the method includes performing, by the micro-operations cache, comparing, in parallel, the identifier of the second instruction against an identifier of the respective way in the tag array and an offset portion of the identifier of the second instruction against a set of intermediate entries of the tag array in parallel and providing, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the method includes performing, by the micro-operations cache, providing, by the tag array based on a determination that the identifier of the second instruction is a hit in the micro-operations cache, a way number of one of the ways with which the second instruction is associated and the indication of the location of the second set of micro-operations in the cache line of the micro-operations cache and providing, by the data array, data from a set of micro-operations lines in the one of the ways to a way multiplexer. In at least some example embodiments, the method includes performing, by the micro-operations cache, providing the way number of the one of the ways with which the second instruction is associated as an input into the way multiplexer and selecting, by the way multiplexer from the set of micro-operations lines in the one of the ways based on the way number, data from the cache line of the micro-operations cache. In at least some example embodiments, the method includes performing, by the micro-operations cache, providing, to an aligner, the data from the cache line of the micro-operations cache and the indication of the location of the second set of micro-operations in the cache line of the micro-operations cache and reading, by the aligner from the data from the cache line of the micro-operations cache based on the indication of the location of the second set of micro-operations in the cache line of the micro-operations cache, the second set of micro-operations.

In at least some example embodiments, an apparatus includes means for decoding a first instruction into a first set of micro-operations and a second instruction into a second set of micro-operations, means for storing, by a micro-operations cache in a cache line of the micro-operations cache, the first set of micro-operations and the second set of micro-operations, and means for storing, by the first micro-operations cache for the cache line of the micro-operations cache, an identifier of the first instruction and an entry for the second instruction, wherein the entry for the second instruction includes an identifier of the second instruction and an indication of a location of the second set of micro-operations in the cache line of the micro-operations cache. In at least some example embodiments, the identifier of the first instruction, the identifier of the second instruction, and the indication of the location of the second set of micro-operations in the cache line of the micro-operations cache are stored in the cache line of the micro-operations cache. In at least some example embodiments, the identifier of the first instruction, the identifier of the second instruction, and the indication of the location of the second set of micro-operations in the cache line of the micro-operations cache are stored as part of a set of metadata stored in the cache line of the micro-operations cache. In at least some example embodiments, the identifier of the first instruction is based on a combination of an IP-Tag of the first instruction and an IP-Offset of the first instruction. In at least some example embodiments, the identifier of the second instruction is based on a combination of an IP-Tag of the first instruction and an IP-Offset of the second instruction. In at least some example embodiments, the IP-Offset of the second instruction and the indication of the location of the second set of micro-operations in the cache line of the micro-operations cache are stored as a tuple in the cache line of the micro-operations cache. In at least some example embodiments, the indication of the location of the second set of micro-operations in the cache line of the micro-operations cache includes an offset, from a beginning of a first micro-operation in the first set of micro-operations, to a first micro-operation in the second set of micro-operations. In at least some example embodiments, the first set of micro-operations and the second set of micro-operations are stored in a data array entry of a data array of the micro-operations cache. In at least some example embodiments, the identifier of the first instruction, the identifier of the second instruction, and the indication of the location of the second set of micro-operations in the cache line of the micro-operations cache are stored in a tag array entry of a tag array of the micro-operations cache. In at least some example embodiments, based on decoding of the second instruction and storage of the second set of micro-operations as intermediate micro-operations in the cache line of the micro-operations cache, the identifier of the second instruction and the indication of the location of the second set of micro-operations in the cache line of the micro-operations cache are stored in a next empty intermediate entry within a tag array entry for the second instruction in a tag array of the micro-operations cache. In at least some example embodiments, based on a determination that a lookup of the identifier of the second instruction in a tag array entry of a tag array of the micro-operations cache does not match an identifier of the tag array entry but is within range of a set of intermediate entries of the tag array entry, an offset portion of the identifier of the second instruction is looked up among the set of intermediate entries of the tag array entry to identify one of the intermediate entries of the tag array entry storing the indication of the location of the second set of micro-operations in the cache line of the micro-operations cache. In at least some example embodiments, based on identification of the one of the intermediate entries of the tag array entry storing the indication of the location of the second set of micro-operations in the cache line of the micro-operations cache, the second set of micro-operations is retrieved from the cache line of the micro-operations cache based on the indication of the location of the second set of micro-operations in the cache line of the micro-operations cache and the second set of micro-operations is provided to an execution unit. In at least some example embodiments, the apparatus includes means for performing, by the micro-operations cache, comparing the identifier of the second instruction with an identifier of a tag array entry of a tag array, means for performing, based on a determination that the identifier of the second instruction and the identifier of the tag array entry do not match but that the identifier of the second instruction is within range of a set of intermediate entries of the tag array entry, a lookup of an offset portion of the identifier of the second instruction in each of the intermediate entries of the tag array entry in parallel, and means for providing, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the apparatus includes means for performing, by the micro-operations cache, comparing the identifier of the second instruction with an identifier of a tag array entry of a tag array and comparing an offset portion of the identifier of the second instruction against a set of intermediate entries of the tag array entry in parallel and providing, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the apparatus includes means for performing, by the micro-operations cache, selecting, by an address decoder of a data array including a set of ways, each of the ways corresponding to the identifier of the second instruction and performing, on each of the selected ways in a tag array, a respective set of operations for attempting to retrieve the indication of the location of the second set of micro-operations in the cache line of the micro-operations cache from the respective way in the tag array. In at least some example embodiments, to perform the respective set of operations for attempting to retrieve the indication of the location of the second set of micro-operations in the cache line of the micro-operations cache from the respective way in the tag array, the apparatus includes means for performing, by the micro-operations cache, comparing the identifier of the second instruction against an identifier of the respective way in the tag array, determining, based on a determination that the identifier of the second instruction does not match the identifier of the respective way in the tag array, whether a condition for the respective way of the tag array is satisfied, wherein the condition for the respective way of the tag array is that the identifier of the second instruction is greater than the identifier of the respective way in the tag array but less than a sum of the identifier of the respective way in the tag array and a size of the respective way in the tag array, comparing, based on a determination that the condition for the respective way of the tag array is satisfied, an offset portion of the identifier of the second instruction against a set of intermediate entries of the tag array in parallel, and providing, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, to perform the respective set of operations for attempting to retrieve the indication of the location of the second set of micro-operations in the cache line of the micro-operations cache from the respective way in the tag array, the apparatus includes means for performing, by the micro-operations cache, comparing, in parallel, the identifier of the second instruction against an identifier of the respective way in the tag array and an offset portion of the identifier of the second instruction against a set of intermediate entries of the tag array in parallel and providing, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache. In at least some example embodiments, the apparatus includes means for performing, by the micro-operations cache, providing, by the tag array based on a determination that the identifier of the second instruction is a hit in the micro-operations cache, a way number of one of the ways with which the second instruction is associated and the indication of the location of the second set of micro-operations in the cache line of the micro-operations cache and providing, by the data array, data from a set of micro-operations lines in the one of the ways to a way multiplexer. In at least some example embodiments, the apparatus includes means for performing, by the micro-operations cache, providing the way number of the one of the ways with which the second instruction is associated as an input into the way multiplexer and selecting, by the way multiplexer from the set of micro-operations lines in the one of the ways based on the way number, data from the cache line of the micro-operations cache. In at least some example embodiments, the apparatus includes means for performing, by the micro-operations cache, providing, to an aligner, the data from the cache line of the micro-operations cache and the indication of the location of the second set of micro-operations in the cache line of the micro-operations cache and reading, by the aligner from the data from the cache line of the micro-operations cache based on the indication of the location of the second set of micro-operations in the cache line of the micro-operations cache, the second set of micro-operations.

BRIEF DESCRIPTION OF THE DRAWINGS

The teachings herein can be readily understood by considering the following detailed description in conjunction with the accompanying drawings, in which:

FIGS. 7A-7C depict example embodiments of cache lines in an instruction cache of a processor for the program of FIG. 6;

FIGS. 10A-10G depict example embodiments of cache lines in a micro-operations cache of a processor for the program of FIG. 6;

FIGS. 12A-12E depict example embodiments of UC lines in a multi-indexed micro-operations cache for the program of FIG. 6;

To facilitate understanding, identical reference numerals have been used herein, wherever possible, in order to designate identical elements that are common among the various figures.

DETAILED DESCRIPTION

Various example embodiments for supporting a multi-indexed micro-operations cache (MI-UC) in a processor are presented. Various example embodiments for supporting an MI-UC in a processor may be configured to support an MI-UC in which, for a UC line of the MI-UC, multiple indexes into the UC line, for multiple sets of micro-operations (UOPs) stored in the UC line based on decoding of multiple instructions, are supported. Various example embodiments for supporting an MI-UC in a processor may be configured to support an MI-UC in which, for a UC line of the MI-UC storing sets of UOPs for a set of instructions decoded by a decode unit of the processor, respectively, the UC line of the MI-UC includes an identifier of a first instruction decoded to provide the first set of UOPs stored in the UC line of the MI-UC and, for each of one or more subsequent instructions decoded to provide one or more subsequent sets of UOPs stored in the UC line of the MI-UC, an identifier of the respective subsequent instruction and an indication of a location of the respective subsequent set of UOPs for the respective subsequent instruction in the UC line of the MI-UC (e.g., an offset from a first UOP of the first set of UOPs stored in the UC line of the MI-UC to a first UOP of the respective subsequent set of UOPs for the respective subsequent instruction in the UC line of the MI-UC). It will be appreciated that various example embodiments for supporting an UC in a processor may be configured such that, based on use of an MI-UC as the UC of the processor, a new UC line does not need to be allocated when an execution sequence of a program starts from an instruction in the middle of an existing UC line, thereby improving the operation of the UC of the processor. It will be appreciated that these and various other example embodiments and advantages or potential advantages of supporting a multi-indexed UC in a processor may be further understood by way of reference to the various figures, which are discussed further below.

Figure 1:
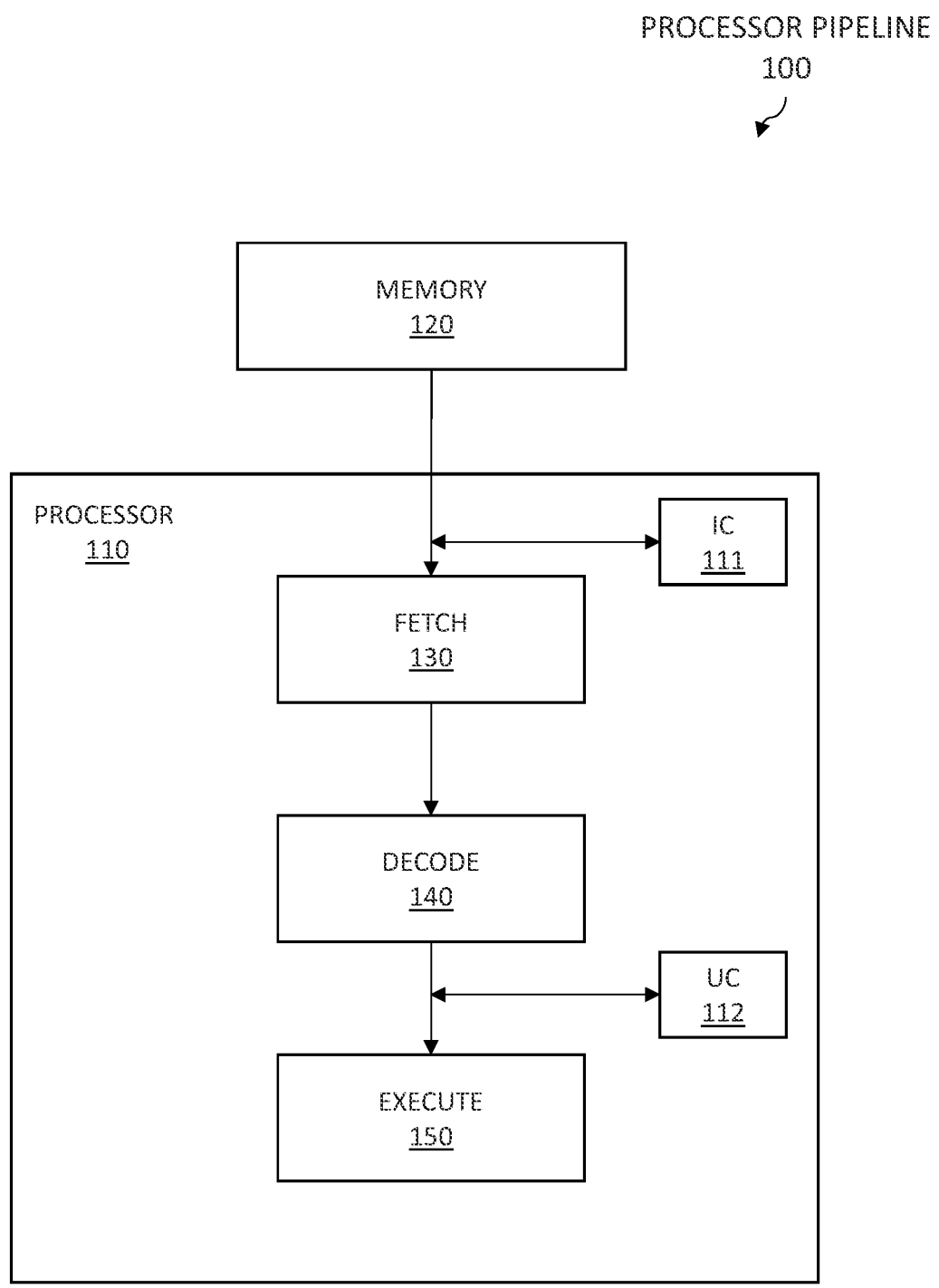
FIG. 1 depicts an example embodiment of computing system including a processor and a memory for illustrating an instruction pipeline supported by the processor.

FIG. 1 depicts an example embodiment of computing system including a processor and a memory for illustrating an instruction pipeline supported by the processor.

The computing system 100 includes a processor 110 and a memory 120. The processor 110 includes an instruction cache (IC) 111 and a micro-operations cache (UC) 112. The high level stages in the pipeline supported by the processor 110 include a fetch stage 130, a decode stage 140, and an execution stage 150.

In the processor 110, the format and encoding of the instructions in a program is determined by the Instruction Set Architecture (ISA) of the processor 110. For example, some well-known ISAs are include x86/x86-64, IA-32/IA-64, MIPS, ARM, and so forth; however, the micro-architecture of a processor cannot execute the instructions of an ISA in their native form because of their complexity. An ISA is designed to offer sophisticated operations which, in turn, also keep the program compact, i.e., reduces the foot print of a program in the memory. It is noted that the optimal footprint of a program in memory is particularly important for optimal use of the IC. A majority of ISAs offer variable-length instructions, which further adds to the complexity of execution. So, at the micro-architectural level of a processor, instructions are represented by fixed length simpler micro-operations (generally referred to as "micro-ops" or "UOPs"). An ISA instruction is broken down into one or more fixed-length UOPs. UOPs perform basic operations on data stored in one or more registers, including transferring data between registers or between registers and external buses, and performing arithmetic and logical operations on registers. For example, an add-register-to-memory ISA instruction performs addition of the value in a register X to the value in a memory location M. The instruction is broken down into a sequence of three separate UOPs as follows: (1) load from M to a register Y, (2) add Y to X, and (3) store X to M.

In the processor 110, execution of a program is based on pipeline which, as indicated above, includes the fetch stage 130, the decode stage 140, and the execution stage 150. The fetch stage 130 retrieves a block of instructions of a program from memory 120 or IC 111. The IC 111 is located on board the processor 110. The IC 111 is generally much smaller in size (e.g., 32 KB, 64 KB, 128 KB, or the like) than the memory 120 and, thus, much faster than the memory 120. The IC 111 caches blocks of instructions fetched from the memory 120. If a set of instructions is repeatedly fetched then those instructions are likely available in the IC 111, so a hit in the IC 111 reduces the time to fetch instructions (as compared with fetching the instructions from the memory 120). The IC 111 is agnostic of syntax and semantics of instructions and caches in units of memory blocks, i.e., all instructions in a certain range of addresses in memory 120. The processor 110 fetches a block of instructions from the memory 120 only if the block is not found in the IC 111. In the IC 111, a memory block is identified by the first memory address in the memory block. In the decode stage 140, instructions fetched during the fetch stage 130 are dynamically decoded by the processor 110 to the native UOPs of the instructions. This dynamic decoding also provides a cleaner separation of the "stable" and "standardized" ISA from the underlying micro-architecture of the processor that is free to define its own UOP set. As a result, a program that has been written for an ISA can run on different micro-architectures supporting that ISA. This has enabled program compatibility between different generations of processors to be easily achieved. For example, different micro-architectures can support the same ISA, but each can define their own native UOP set. The execute stage 150 executes the UOPs supplied by the decode stage 140.

In the processor 110, the fetch stage 130 and the decode stage 140 generally are costly in terms of clock cycles as well as power consumption. So, many modern processors implement another instruction cache, typically referred to as a micro-op cache (UC) or decoded stream buffer (DSB), which stores the already decoded UOPs. This is illustrated as the UC 112 of the processor 110. When the processor 110 needs to execute an instruction and its decoded UOPs already exists in the UC 112, then the UC 112 can directly supply the UOPs to the execution unit. The UC 112 is generally much smaller in size (e.g. 1.5 KB, 2 KB, 3 KB, or the like) than the IC 111 and the memory 120 and, thus, much faster than the IC 111 and the memory 120 (typically operating at the clock speed of the processor 110). A hit in UC 112 eliminates the fetch stage 130 and the decode stage 140, both of which are costly, thereby improving the performance and power budget of the processor 110. An instruction is fetched and decoded only if it is a miss in the UC 112, otherwise the fetch stage 130 and the decode stage 140 can be powered off.

The UC 112 stores the UOPs received from the decode stage 140 in smaller sized blocks, but in the sequential order of execution. This means that each branch, conditional or unconditional, makes the processor 110 start with a new UC line even if the current UC line is not yet filled. This simple rule allows high bandwidth fetching from the UC 112 since, once there is a hit in UC 112, then the entire UC line can be supplied to the execution stage 150 without worrying about a change of execution sequence in the middle of a UC line. Herein, unless indicated otherwise, an address of an instruction in memory is referred to as an Instruction Pointer (IP). A UC line is identified by the IP of the parent instruction of the first UOP in the UC line; other than that no correlation exists between the UOPs in a UC line and their corresponding parent instructions, and it is noted that such correlation is not required since the entire UC line is supplied to the execution stage 150. As a result, intermediate UOPs in a UC line cannot be looked up by the IPs of their parent instructions.

It will be appreciated that processors generally implement each of the three high-level stages of the instruction pipeline using additional stages. As a result, a pipeline of a processor may be composed of a large number of stages (e.g., 20 or more stages). An example of a processor, for illustrating stages used to implement portions of the instruction pipeline, is presented with respect to FIG. 2.

Figure 2:
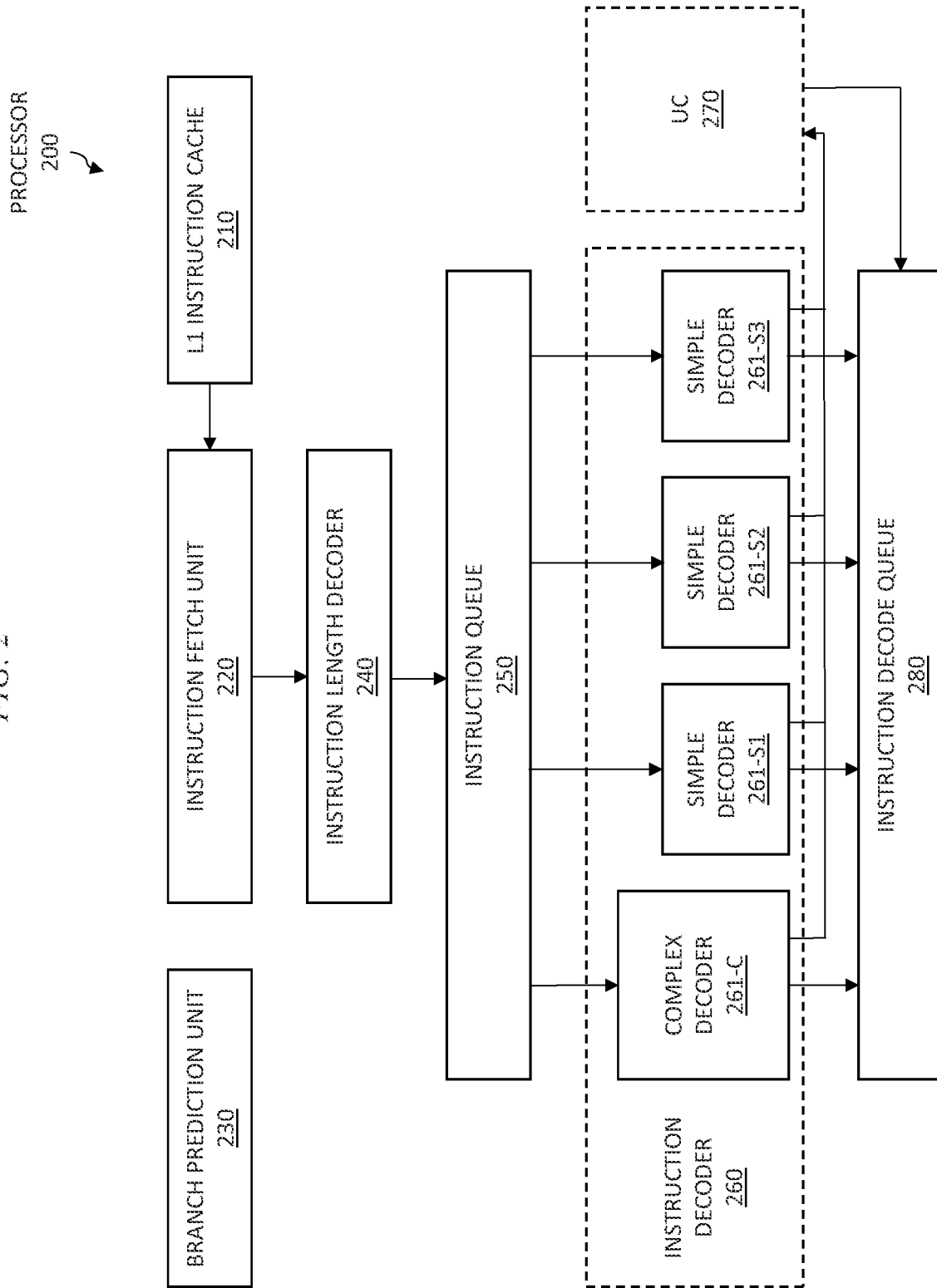
FIG. 2 depicts an example embodiment of a processor for use as the processor of the computing system of FIG. 1.

FIG. 2 depicts an example embodiment of a processor for use as the processor of the computing system of FIG. 1.

The processor 200 may include a frontend and a backend. It is noted that while details of the frontend are illustrated, details of the backend have been omitted for purposes of clarity.

The processor 200 includes a level 1 (L1) instruction cache (L1-IC) 210, an instruction fetch unit (IFU) 220, a branch prediction unit (BPU) 230, an instruction length decoder (ILD) 240, an instruction queue (IQ) 250, an instruction decoder (ID) 260, a UOP cache (UC) 270, and an instruction decoder queue (IDQ) 280. It will be appreciated that the IFU 220 and BPU 230 may be considered to form the fetch stage while the ILD 240, ID 260, and IDQ 280 may be considered to form the decode stage.

The L1-IC 210 is a cache that is part of the cache hierarchy of the associated processor and may be further understood by considering the cache hierarchy of processors and the cache arrangement of caches.

In general, a cache is a smaller, faster memory, closer to a processor, which stores copies of the program data or program instructions from frequently used memory locations to reduce the average cost of access (time or energy). The data or program instructions are stored in the cache by blocks of contiguous memory locations, typically referred to as cache lines, where each cache line is indexed in the cache by the first memory address in the cache line. Caches benefit from the temporal and spatial locality of memory access patterns in a program, where spatial locality refers to use of relatively close memory locations (i.e., within a cache line) and temporal locality refers to the reuse of specific cache line within a relatively small time duration. Many processors use multiple levels of caches. For example, a common processor architecture might utilize at least three levels (L) of caches, which are typically referred to as L1, L2, and L3. The L1 cache is the smallest and nearest to the processor and, thus, faster than the other cache levels. Typically, the L1 cache is split into two portions: the L1 Instruction Cache (e.g., 32 KB is size, although other sizes may be used) which holds only program instructions and the L1 Data Cache (e.g., 32 KB in size, although other sizes may be used) which holds only program data. The L2 cache (e.g., 256 KB in size, although other sizes may be used) and the L3 cache (e.g., 2 MB in size, although other sizes may be used) are the subsequent levels which are usually unified caches (meaning that they hold both instructions and program data). The L3 cache typically is common for the processor cores in a multi-core processor and, thus, is located outside of the processor cores. It will be appreciated that the cache size and access latency grow according to the levels. If the cache line corresponding to a memory address sought is missing in the L1 cache, then the processor looks up in subsequent levels of caches (e.g., L2 cache, then L3 cache, and so forth). If the memory address is missing in all of the available cache levels, then the processor can access the main memory to retrieve the instruction or data at the memory address. So main memory is accessed only if the memory address is missing in all caches. The missing block, once located, is brought into a cache line in the L1 cache.

In general, a cache is typically organized as set associative array, which can be imagined as M×N matrix. The cache is divided into M sets and each set contains N cache lines. To place a memory block into the cache, its address is typically segregated into 3 fields—tag, index, offset. A memory block is first mapped into a set based on 'index bits' derived from the address of the memory block. Then the memory block is placed into a cache line in the set and a 'tag' is stored in the cache line. The tag is composed of the bits in the address of the memory block (other than the index bits) that can distinguish between the cache lines sharing the same set. The offset field refers to any address within a cache line. The offset field is composed of a few least significant bits of the address and the number of bits is dependent on the size of the cache line. For example, if the cache line size is 64B, then the 6 least significant bits of the addresses are the offset bits. Here, the term Instruction Pointer (IP) is used to denote the memory address of an instruction, and the 3 fields of an IP that are used to map a block of instructions into a cache are referred to as IP-Tag, IP-Index, and IP-Offset. If all cache lines in a set are occupied while trying to store a new memory block, then an existing cache line in the set is evicted (a replacement policy picks which cache line to evict) to make way for the new memory block. When the evicted cache line is accessed later, then it will result in a miss in the cache and, thus, will need to be brought back into the cache from the memory hierarchy. Such misses are referred to as conflict misses and repeated conflict misses due to collisions between cache lines sharing the same set is referred to as thrashing.

The IFU 220 is responsible for feeding the processor with instructions to execute, and thus, it is the first component where instructions are processed. The IFU 220 mainly includes the required logic to compute the next fetch address and then fetch the instructions from the L1-IC 210. The instructions are fetched from the L1-IC 210 by the IFU 220 in streams of raw bytes.

The BPU 230 is configured to predict the next fetch address for the IFU 220, because otherwise branch instructions introduce a significant extra level of complexity in fetching streams of instructions, since the correct fetch address cannot be calculated until the branch instruction itself is executed. By default, instructions are processed by a processor sequentially. This sequential execution can be disrupted by the control instructions (e.g., conditional branches, unconditional branches, subroutine calls and subroutine returns, and so forth) to start executing an instruction sequence starting at a new address (the target address). For example, JE (Jump If Equal) is an example of a conditional branch instruction in x86. A conditional branch is data-dependent (e.g., value of a data acts as the condition) and branches to the target address only if the condition is true. For example, instructions such as CALL, RET, and JUMP are examples of a subroutine call, a subroutine return, and an unconditional branch, respectively, in x86. Any control instruction other than conditional branch instruction will switch the execution sequence to the target address specified in the instruction. Herein, the target instruction sequence of a control instruction is referred to generally as a control block. Execution of a program can be viewed as executing a chain of certain control blocks. Herein, an order of execution of control blocks in a program is referred to as a control flow (i.e., flow of control). Conditional branches (e.g., JE) can generate multiple control flows in a program since every such branch is a fork and the execution can go either way on the fork based on the condition of the fork. Control instructions introduce significant extra complexity in fetching streams of instructions, since the correct fetch address after the control instruction cannot be calculated until the backend executes the control instruction itself. For this reason, the frontend of high-performance processors (namely, the BPU 230) predicts the next fetch address and speculatively starts fetching from the predicted address. There are two parts in this prediction. The first is predicting the direction of the branch taken by the control instruction, i.e., taken to the target sequence or not taken. The second part is predicting the target address of a branch. Once the direction of a branch is predicted, then the memory address of the control instruction and its predicted target address is stored in a Branch Target Buffer (BTB), which is a cache organized similar to the set associative array described in the context of L1-IC 210.

The ILD 240 provides a pre-decode phase. The ILD 240 separates the raw byte stream from IFU 220 into a sequence of valid instructions and passes them to the IQ 250. For example, as indicated above, the length of an x86 instruction may vary between 1B to 15B and may reside in any byte address in program memory, thus, requiring segregation of the raw byte stream into instructions of variable lengths. Decoding the length of several instructions per cycle adds a level of complexity, since the start addresses have to be speculatively determined. That is, the fact that the starting address of the second instruction is not known until the first instruction is decoded and its length computed, imposes serialization of the length decoding process, and parallelizing this requires determining the length of each instruction before decoding it. The ILD 240 provides complex logic, based on many parallel and speculative computations, to help achieve such parallelization (although this comes at the price of increased power consumption).

The IQ 250 queues the instructions for the instructions decode phase. The IQ 250 queues the instructions, after the ILD 240 separates the instructions from the stream of raw bytes, for use by ID 260 in the instructions decode phase.

The ID 260 provides the instructions decode phase (which also may be referred to as a dynamic translation phase). In this phase, instructions are read from the IQ 205 and translated into subsequent functionally-equivalent UOPs. This translation is performed by one of several decoders in a set of decoders 261 including a complex decoder 261-C and three simple decoders 261-S1-261-S3 (although it will be appreciated that fewer or more instruction decoders may be used). Herein, the ID 260, including the set of decoders 261, also may be referred to as a Micro Instruction Translation Engine (MITE). The resultant UOPs are passed by the ID 260 to the IDQ 280, through which the UOPs may then enter the backend of the processor. For example, in an x86-based processor, simple instructions can translate into 1-4 UOPs and complex instructions can translate into 5 or more UOPs. It will be appreciated that for processors based on other ISAs, instructions may be translated into other numbers of UOPs.

The UC 270, generally speaking, is a UOP cache that is configured to cache UOPs for instructions previously decoded by the MITE, thereby obviating a need for the MITE to re-decode instructions previously decoded by the MITE in order to obtain the associated UOPs (namely, avoiding the L1-IC→IFU→ILD→MITE decode path). This type of cache may be referred to as an L0 Instruction Cache (L0-IC), which may store blocks of instructions decoded into UOPs, in units of UC lines. UOP caches benefit from the temporal locality of control flows in a program, due to which previously executed instructions are executed again. Before fetching an instruction address from the L1-IC 210, it is first looked up in the L0-IC. If the corresponding UC line exists (meaning a hit) in the L0-IC, then the associated UOPs are directly supplied to the IDQ 280 for further execution, thereby completely avoiding the L1-IC→IFU→ILD-→MITE decoding path. If the corresponding UC line does not exist (meaning a miss) in the L0-IC, then the instruction goes through entire complex decoding cycle through the L1-IC→IFU→ILD→MITE decoding path. The ability to avoid the L1-IC→IFU→ILD→MITE decoding path in this manner provide significant advantages, as the decoding process from instructions to UOPs (especially for high performance processors) can be costly in terms of circuitry, power consumption, and time, especially where a single complex instruction may perform several operations. It will be appreciated that, since the backend of a superscalar processor can execute several UOPs per clock cycle (e.g., 6 UOPs per cycle), the rate at which UOPs are supplied from the frontend of the processor to the backend of the processor is a key element of performance which may be achieved by high hit rate in the UC 270.

The IDQ 280 queues UOPs to be provided to the backend of the processor. The UOPs that are queued by the IDQ 280 may include UOPs decoded by the ID 260 (MITE) and UOPs delivered from the UC 270.

The backend of the processor 200, although the details are omitted for purposes of clarity, may include various elements such as a reorder buffer (e.g., configured to receive UOPs from the frontend of the processor 200), a unified reservation station having a set of ports configured to direct UOPs to various chains of elements), various elements or chains of elements configured to support execution of UOPs, or the like, as well as various combinations thereof.

Figure 3:
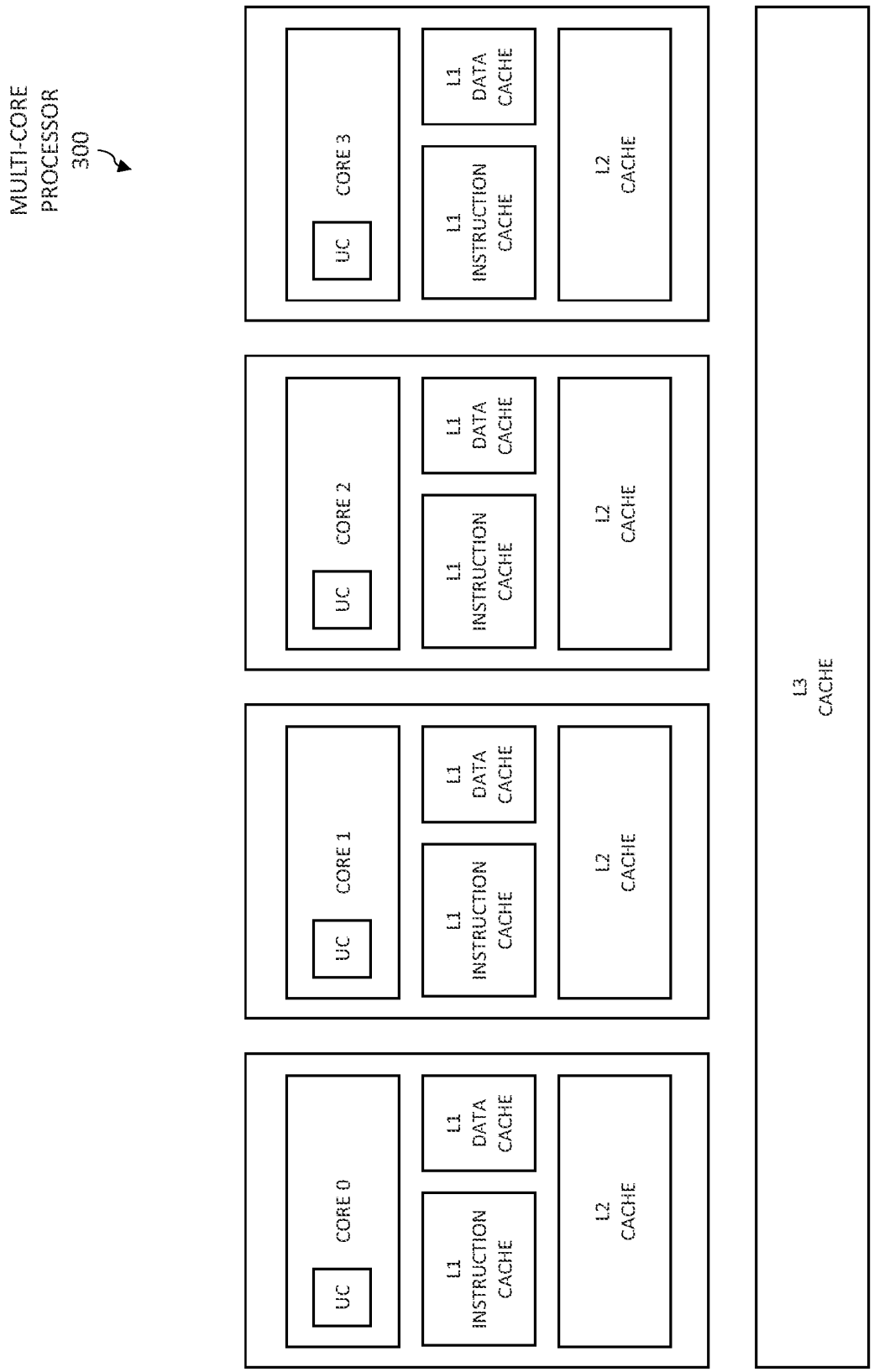
FIG. 3 depicts an example embodiment of a multi-core processor including multiple cores and multiple levels of caches.

FIG. 3 depicts an example embodiment of a multi-core processor including multiple cores and multiple levels of caches.

The multi-core processor 300 of FIG. 3 includes four cores (denoted as Core 0, Core 1, Core 2, and Core 3) and three levels of caches (denoted as L1, L2, and L3).

In general, a core is configured to operate as a processor (e.g., similar to the only core of a single core processor). Accordingly, it will be appreciated that each of the cores has its own pipeline (e.g., following the conceptual pipeline of FIG. 1, which may be implemented like the pipeline of FIG. 2 or using any other suitable pipeline implementation) that independently fetches, decodes, and executes instructions. Herein, unless indicated otherwise, the term "processor"

may be referring to the only core of a single core processor or a core of a multi-core processor.

In general, a cache is a smaller, faster memory, closer to a processor core, which stores copies of the program data or program instructions from frequently used memory locations to reduce the average cost (time or energy). The data or program instructions are stored in the cache by blocks of contiguous memory locations, referred to as cache lines, wherein each cache line is indexed in the cache by the first memory address in the cache line. Caches benefit from the temporal and spatial locality of memory access patterns in a program. Spatial locality refers to use of relatively close memory locations (i.e., within a cache line). Temporal locality refers to the reuse of a specific cache line within a relatively small time duration.

L1 cache is the smallest and nearest to the processor core and, thus, faster than the rest. L1 cache is split into two as follows: an L1 Instruction Cache (e.g., 32 KB size or other suitable size) which holds only program instructions and an L1 Data Cache (e.g., 32K size or other suitable size) which holds only program data. L2 caches (e.g., 256 KB size or other suitable size) and L3 caches (e.g., 2 MB size or other suitable size) are the subsequent levels of caches, which are usually unified caches (meaning that the caches hold both instructions and program data. The L1 Instruction Cache is the IC in FIG. 1. L3 cache is common for of the all cores in the processor. Size and access latency grow according to the levels. If the cache line corresponding to a memory address sought is missing in L1 cache, then processor performs lookups in subsequent levels of caches. Main memory is accessed only if the memory address is missing in all caches. Eventually, the missing block is read into a cache line in L1 cache. UC is located inside a core. It will be appreciated that the operation of ICs and UCs in processors may be further understood by first considering the logical organization of an IC in a processor.

Figure 4:
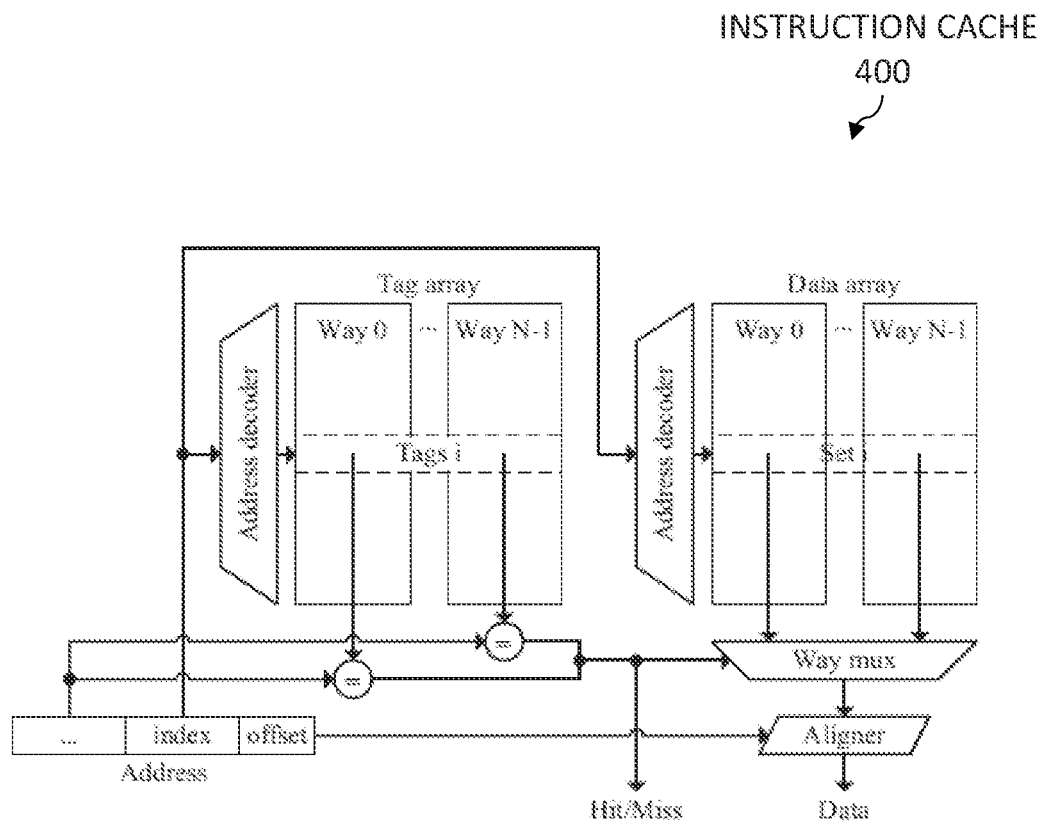
FIG. 4 depicts an example embodiment of an N-way set associative instruction cache for use in a processor.

FIG. 4 depicts an example embodiment of an N-way set associative instruction cache for use in a processor.

As illustrated in FIG. 4, the IC 400 includes two main building blocks: the tag array and the data array.

The data array stores the IC lines, while the tag array is used in order to match IPs into data array entries. The data array is logically organized as a group of S number of sets. Each set consists of N number of IC lines (which also may be referred to herein as "IC blocks"). The number of IC lines in a set is called the "degree of associativity" of the cache. It is noted that a cache of associativity N is a N-way associative cache, wherein each way is a IC line. A memory block is first mapped into a set Si by its IP and then placed into any IC line Nj in the set Si. To map a memory block into the IC, the IP is partitioned into three fields as illustrated in FIG. 5.

Figure 5:
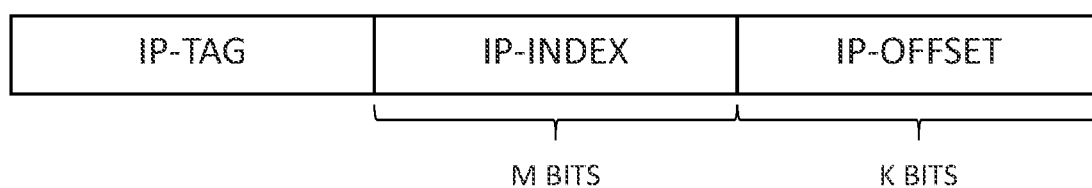
FIG. 5 depicts an example embodiment of an Instruction Pointer format for an address of an instruction in memory.

FIG. 5 depicts an example embodiment of an Instruction Pointer format for an address of an instruction in memory. Here, the term Instruction Pointer (IP) may be used to refer to the address of an instruction in memory. As illustrated in FIG. 5, the IP 500, in order to map a block into an IC, is partitioned into the following fields: IP-tag, IP-index, and IP-offset.

The IP-offset field (which also may be referred to as the block offset or, more generally, the offset) includes the K least significant bits of the IP, which are used to identify which bytes inside an IC line are to be accessed. Assuming the size of IC line is Q bytes, then $K=\log_2(Q)$ bits in the IP-offset field. Herein, unless indicated otherwise, these K bits are denoted as IP-offset.

The IP-index field (which also may be referred to more generally as the offset) includes the M next least significant bits of the IP, which are used to identify the set Si in the IC. For a IC consisting of S sets, $M=\log_2(S)$ bits are needed in the IP-Index field. Herein, unless indicated otherwise, these M bits are denoted as IP-index.

The IP-tag field includes the remaining bits of the IP. Herein, unless indicated otherwise, these bits are denoted as IP-Tag.

Different IC lines can map to the same set Si in the IC (they have the same IP-index due to overlapping M bits), so a mechanism is needed to reverse-map IP-indexes to IPs. The tag array serves this purpose. The tag array has the same logical organization as the data array (same number of sets S and associativity N). For each IC line in the data array, the tag array holds some metadata: the IP-tag bits and the state of the IC line (valid, etc.).

To lookup an IP, a set Si in both the data and the tag arrays are accessed using the IP-Index part, but to know if an IC line within the set corresponds to the given IP, the IP-tag bits must match to an entry in set Si in tag array. If the IP-Tag bits of the j-th entry in set Si match, then the correct data is in the j-th IC line of the corresponding data array in set Si (this is called a cache hit). If no IP-Tags in in set Si match in the tag array, then the requested IC line does not reside in the IC (this is a cache miss). In the case of a cache miss, a request to the higher levels of the memory hierarchy must be issued and the processor must wait for the IC line to be installed in the IC before the access can proceed.

As an example, consider an 8-way associative cache with 64 sets with a cache line size of 64B. Then, each cache line would hold a block of 64B of instructions. Here K=6 and M=6. If the processor tries to access an instruction at IP 0xf045 (tag=0x1e, index=0x1, offset=0x5) then it looks for the cache line in set 1 bearing the tag 0x1e. If the IC line is found, then the 5th byte in the IC line is retrieved.

The access to the tag and data array can occur in parallel or serially. In FIG. 4, a whole set is read from the data array while the tag array is accessed. The address is compared with the IP-tag entries to find in which IC line of the set reside the data that needs to be accessed. This information is fed to a multiplexor at the output of the data array (the way multiplexor) that chooses one of the IC lines of the set. Finally, the offset part of the address is used to extract the appropriate bytes from the chosen IC line (this process is called data alignment).

The number of bits in the IP-Offset field determines the size of an IC line, i.e., the size of an IC line is $\log_2$ (number of bits in IP-Offset field). The set in the IC is selected based on IP-Index and an IC line within the set (i.e., a way in the set) is tagged with the IP-Tag. In the example in FIG. 4, IP-Offset is 4-bits, IP-Index is 4 bits, and IP-Tag is 8-bits and, thus, for the exemplary IC line, IP-Tag=0xFF and IP-Index=0x0. Thus, the IC line is tagged with 0xFF in the set 0. As evident, all instructions within an IC line share the same IP-Tag and IP-Index.

The IC suffers from conflict misses when P frequently accessed IC lines map to the same set Si, and the cache associativity N is <P. In that case, one of the valid IC lines in the set Si needs to be evicted out to accommodate a newer IC line. Obviously, the higher the associativity, the less conflict misses the IC will suffer. On the other hand, the more ways the IC has, the bigger the way multiplexor becomes, and this may affect the cycle time of the processor. For example, a modern L1-IC is typically organized as 64 sets×8 ways×64B per IC line, totaling to maximum capacity of 32 KB of instructions; however, it will be appreciated that various other implementations may be used.

Figure 6:
FIG. 6 depicts an example embodiment of a program for illustrating caching of instructions of the program in a micro-operations cache.

FIG. 6 depicts an example embodiment of a program for illustrating caching of instructions of the program in a micro-operations cache.

The program 600 of FIG. 6 includes a set of instructions. The size of an instruction can vary, ranging from one byte to multiple bytes. A first execution sequence (of instructions) can be switched to a second execution sequence (of instructions) by a branch instruction, which may be a conditional branch instruction or an unconditional branch instruction. A typical program has a branch instruction in every 6 instructions. For simplicity and without the loss of generality, the program 600 of FIG. 6 illustrates only unconditional branch instructions (denoted as jump xx). The caching of the instructions in an IC by the processor is illustrated with respect to FIGS. 7A-7C. The construction of the UC lines in the UC as the instructions of the program 600 are fetched and decoded by the processor is illustrated with respect to FIGS. 8A-8G.

FIGS. 7A-7C depict example embodiments of cache lines in an instruction cache of a processor for the program of FIG. 6.

It is noted that, since the fetching stage is not aware of syntax and semantics of instructions, it is not necessary that an IC line terminate at the boundary of a multi-byte instruction. Thus, an instruction can stride across two IC lines. For simplicity and without the loss of generality, embodiments of IC lines are described with instructions starting and terminating at the boundary of an IC line.

The processor starts fetching from Instr_1. Assume that Instr_1 to Instr_5 fits into an IC line. This means that all instructions in the IC line share the same IP-Tag and IP-Index. So, when the processor fetches Instr_1 from memory, it caches Instr_1 to Instr_5 in an IC line addressed by IP of Instr_1, as shown in FIG. 7A.

The processor, after the execution of jump_100, starts fetching from Instr_100. Assume that Instr_100 to Instr_107 fits into an IC line. So, when the processor fetches Instr_100 from memory, it caches Instr_100 to Instr_107 in an IC line addressed by IP of Instr_100, as shown in FIG. 7B.

The processor, after execution of jump_25, starts fetching from Instr_25. Assume that Instr_25 to Instr_29 fits into an IC line. So, when the processor fetches Instr_25 from memory, it caches Instr_25 to Instr_29 in an IC line addressed by IP of Instr_25, as shown in FIG. 7C.

The processor, after the execution of jump_102, starts fetching from Instr_102. Since Instr_102 shares the same IP-Tag and IP-Index with Instr_100, so the processor hits the IC Line 2. Instr_102 is fetched by its offset from the IC Line 2.

The UC stores the UOPs received from the decode stage in smaller sized blocks, but in the sequential order of execution. This means that each branch, conditional or unconditional, makes the processor start with a new UC line even if the current UC line is not yet filled. This simple rule allows high bandwidth fetching from the UC since, once there is a hit in UC, then the entire UC line can be supplied to the execution stage without worrying about a change of execution sequence in the middle of a UC line. Herein, unless indicated otherwise, an address of an instruction in memory is referred to as an Instruction Pointer (IP). A UC line is identified by the IP of the parent instruction of the first UOP in the UC line; other than that no correlation exists between the UOPs in a UC line and their corresponding parent instructions, and it is noted that such correlation is not required since the entire UC line is supplied to the execution stage. As a result, UOPs in a UC line cannot be looked up by the IPs of their parent instructions. UC lines are typically organized in a N-way associative array, similar to an IC as in FIG. 4, an example embodiment of which is presented with respect to FIG. 8.

Figure 8:
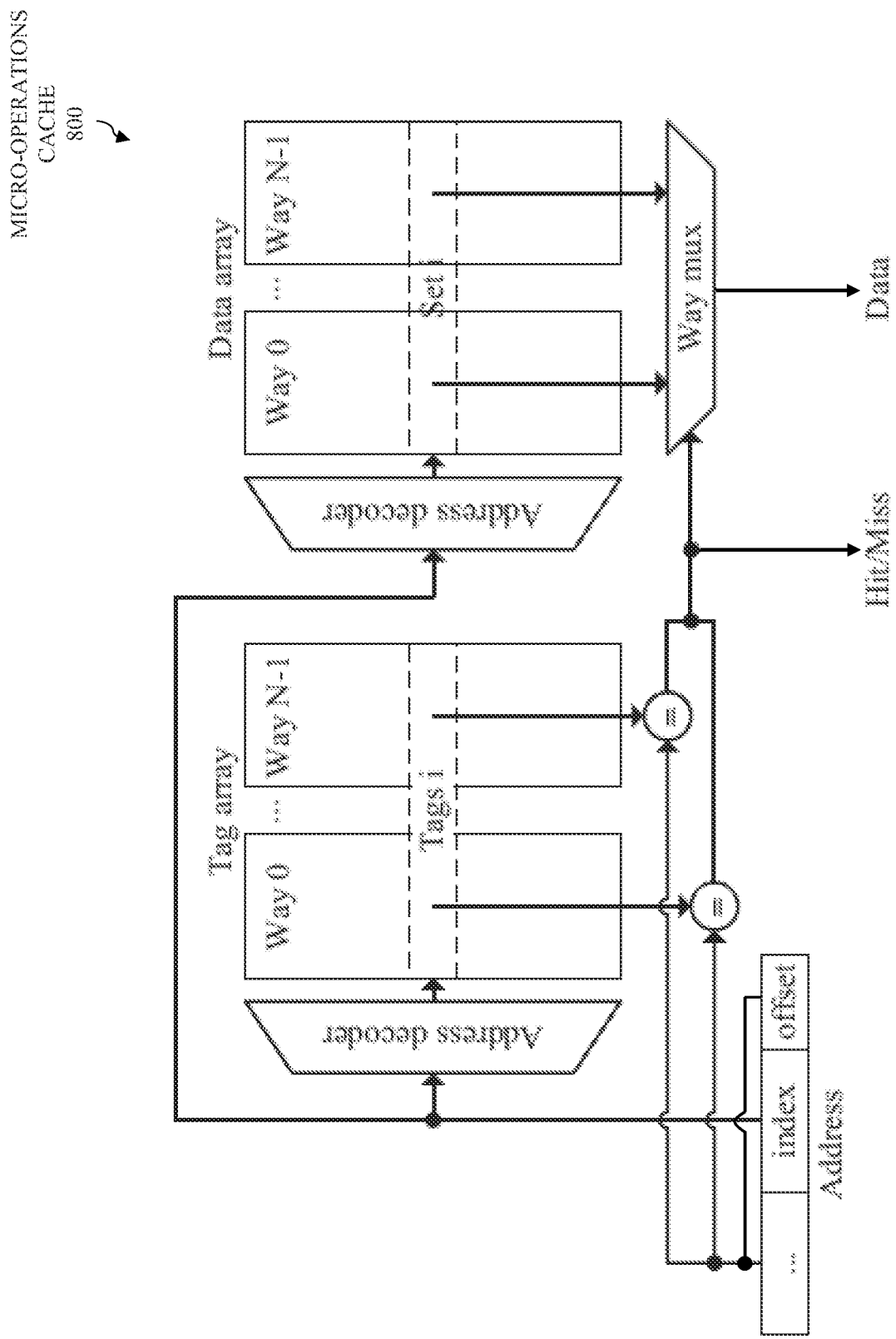
FIG. 8 depicts an example embodiment of an N-way set associative micro-operations cache for use in a processor.

FIG. 8 depicts an example embodiment of an N-way set associative micro-operations cache for use in a processor.

As illustrated in FIG. 8, the UC 800 includes two main building blocks: the tag array and the data array.

The Tag Array is a N-way set associative array wherein each entry contains IP of a UC line, it validity, size (i.e., IP of last instruction in the UC line—IP of first instruction in the UC line), and so forth. An entry needs to keep the "size" so that the processor can increment the IP by the size of the UC line to look for the next UC line in the sequence. The Data Array is an N-way set associative array wherein an entry contains the UC line that corresponds to the entry in the Tag Array. The processor first looks up the tag array by the IP of an instruction. If tag array is a hit, then corresponding entry in data array supplies all the UOPs in the UC line to the execution unit.

For each UC line in the data array, the tag array holds some metadata: the IP-Tag and IP-Offset bits and the state of the UC line (validity, size, and so forth). Note that the IC tag array entry keeps only the IP-Tag since the IC lines are aligned by the fixed size of an IC line, so the IP-Offset field is always zero for the first address in the IC line; however, the UC tag array entry needs to keep both IP-Tag and IP-Offset bits since a UC line always starts with the first instruction of an execution sequence and that instruction can be at any offset within an IC line. So, in FIG. 8, both IP-Tag and IP-Offset are input to the Address Decoder.

Figure 9A:
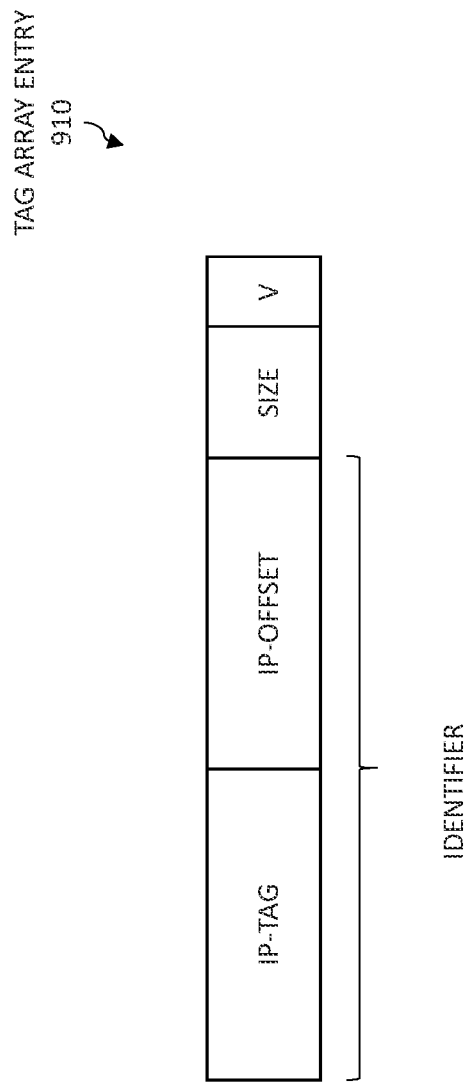
FIGS. 9A and 9B depict example embodiments of a Tag Array entry and a Data Array entry in a micro-operations cache.
Figure 9B:
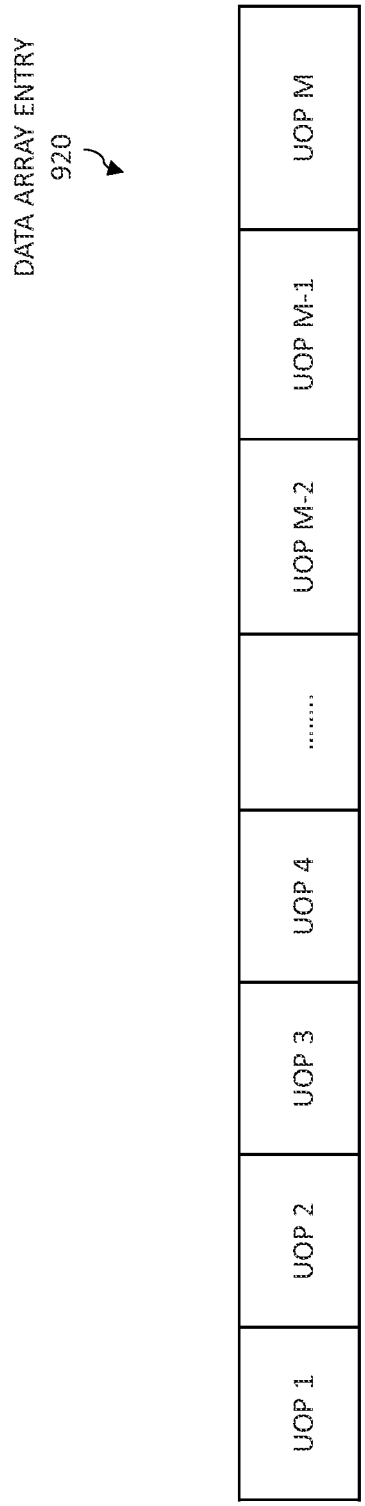

FIGS. 9A and 9B depict example embodiments of a Tag Array entry and a Data Array entry in a micro-operations cache.

The Tag Array entry 910 of FIG. 9A stores metadata associated with the associated Data Array entry 920 of FIG. 9B.

FIG. 9A depicts the Tag Array entry 910 associated with the Data Array entry 920 of FIG. 9B. The Tag Array entry 910 includes an IP-Tag field, an IP-Offset field, a Size field, and a V field. The tuple {IP-Tag, IP-Offset} in the Tag Array entry 910 is denoted as the "Identifier" of the Tag Entry since the tuple is part of the Identifier/IP of the UC line. The "V" bit in the Tag Array entry indicates whether or not a way is valid.

FIG. 9B depicts the Data Array entry 920 associated with the Tag Array entry 910 of FIG. 9A. The Data Array entry 920 holds the UOPs of the instructions included by the UC line. There are a total of M number of UOPs in the exemplary Data Array entry 920.

To lookup an IP in UC, a set Si in both the data and the tag arrays are accessed using the IP-Index part; however, to know if a UC line within the set corresponds to the given IP, the IP-Tag and IP-Offset bits must match to an entry in set Si in tag array. If the IP-Tag bits and IP-Offset bits of the j-th entry in set Si match, then the correct data is in the j-th UC line of the corresponding data array in set Si (this is called a UC hit). If no IP-Tags in set Si match in tag array, then the requested UC line does not reside in the UC (this is a UC miss). In the case of a UC miss, a request to fetch and decode the instruction must be issued. The construction of the UC lines in the UC as the instructions of the program 600 of FIG. 6 are fetched and decoded by the processor is illustrated with respect to FIGS. 10A-10G.

FIGS. 10A-10G depict example embodiments of cache lines in a micro-operations cache of a processor for the program 600 of FIG. 6.

The processor starts execution from Instr_1 of program 600. Initially, there are no valid lines in the UC (i.e., the UC is empty). Since no UC line is found for the IP of Instr_1, the processor starts fetching and decoding from Instr1 and allocates a new UC line for storing the decoded UOPs. The unconditional jump instruction jump_100 switches the execution sequence to start from Instr_100. So, the instructions of the instruction sequence from Instr_1 to jump_100 are decoded and stored in a new UC line, referred to as UC Line 1. The UC Line 1 is identified by the IP of Instr_1. The UC Line 1 is depicted in FIG. 10A.

The processor, after jump_100, starts execution from Instr_100. Since no UC line is found for the IP of Instr_100, the processor starts fetching and decoding from Instr_100 and allocates a new UC line for storing the decoded UOPs. After decoding Instr_103, the UC line is full. So, the instructions of the instruction sequence from Instr_100 to Instr_103 are decoded and stored in the new UC line, referred to as UC Line 2. The UC Line 2 is identified by IP of Instr_100. The UC Line 2 is depicted in FIG. 10B.

The processor then starts execution from Instr_104. Since no UC line is found for the IP of Instr_104, the processor starts fetching and decoding from Instr_104 and allocates a new UC line for storing the decoded UOPs. After decoding jump_25, the processor switches the execution sequence to start from Instr_25. So, the instructions of the instruction sequence from Instr_104 to jump_25 are decoded and stored in the new UC line, referred to as UC Line 3. The UC Line 3 is identified by IP of Instr_104. The UC Line 3 is depicted in FIG. 10C.

The processor then starts execution from Instr_25. Since no UC line is found for the IP of Instr_25, the processor starts fetching and decoding from Instr_25 and allocates a new UC line for storing the decoded UOPs. After decoding jump_102, the processor switches the execution sequence to start from Instr_102. So, the instructions of the instruction sequence from Instr_25 to jump_102 are decoded and stored in the new UC line, referred to as UC Line 4. The UC Line 4 is identified by IP of Instr_25. The UC Line 4 is depicted in FIG. 10D.

The processor then starts execution from Instr_102. Since no UC line is found for the IP of Instr_102, the processor starts fetching and decoding from Instr_102 and allocates a new UC line for storing the decoded UOPs. After decoding jump_25, the processor switches the execution sequence to start from Instr_25. So, the instructions of the instruction sequence from Instr_102 to jump_25 are decoded and stored in the new UC line, referred to as UC Line 5. The UC Line 5 is identified by IP of Instr_102. The UC Line 5 is depicted in FIG. 10E.

The processor then starts execution from Instr_25. The processor already finds the UC Line 4 identified by the IP of Instr_25, so the entire UC Line 4 is directly supplied to the execution unit.

The processor, for the sake of example, then starts executing another sequence starting at instruction Instr_200. Since no UC line is found for the IP of Instr_200, the processor starts fetching and decoding from Instr_200 and allocates a new UC line for storing the decoded UOPs. After decoding jump_103, the processor switches the execution sequence to start from Instr_103. So, the instructions of the instruction sequence from Instr_200 to jump_103 are decoded and stored in the new UC line, referred to as UC Line 6. The UC Line 6 is identified by IP of Instr_200. The UC Line 6 is depicted in FIG. 10F.

The processor then starts execution from Instr_103. Since no UC line is found for the IP of Instr_103, the processor starts fetching and decoding from Instr_103 and allocates a new UC line for storing the decoded UOPs. After decoding jump_25, the processor switches the execution sequence to start from Instr_25. So, the instructions of the instruction sequence from Instr_103 to jump_25 are decoded and stored in the new UC line, referred to as UC Line 7. The UC Line 7 is identified by IP of Instr_103. The UC Line 7 is depicted in FIG. 10G.

While a processor is executing a program such as the program 600, the UC suffers from conflict misses when P frequently accessed UC lines map to the same set Si, and the cache associativity N is less than P. In that case, one of the valid UC lines in the set Si needs to be evicted out to accommodate a newer UC line. It will be appreciated that the higher the associativity the less conflict misses the UC will suffer, whereas, on the other hand, the more ways the UC has then the bigger the way multiplexor becomes and this may affect the cycle time of the processor. In the examples of UC Lines depicted in FIGS. 10A-10G, it may be seen that UC Line 2, UC Line 3, UC Line 5, and UC Line 7 have the UOPs of more than 50% overlapping instructions. The UC Line 5 includes all of the sequences in UC Line 3 and in UC Line 7. Since the UC is much smaller in size, such overlaps among the UC lines lead to inefficient utilization of the UC, which in turn can increase conflict misses and capacity misses in the UC. Additionally, cycles are wasted by the processor in fetching and decoding instructions that already exist at an offset in a UC line, i.e., an intermediate instruction in the UC line.

Various example embodiments for supporting a multi-indexed micro-operations cache (MI-UC) in a processor are presented. Various example embodiments for supporting an MI-UC in a processor may be configured to support an MI-UC in which, for a UC line of the MI-UC storing sets of UOPs for a set of instructions decoded by a decode unit of the processor, respectively, mappings of the IPs of intermediate instructions in the UC line to the offsets of the sets of UOPs in the UC line (e.g., for a given instruction, the offset to the first UOP in the set of UOPs for the given instruction) are stored in the metadata of the UC line. These mappings are referred to as "intermediate entries" in the UC line.

In an MI-UC, when an instruction is decoded and stored in a UC Line and the instruction is an intermediate instruction in the UC Line, an intermediate entry is encoded in the metadata that maps the IP of the instruction to the offset of the first UOP of that instruction in the UC Line.

In an MI-UC, when an IP is looked up in the UC and the IP does not match the Identifier of a UC Line then the IP is looked up among the intermediate entries of the UC Line. If the IP is identified in an intermediate entry of the UC Line, then all UOPs in the UC Line after the offset of the first UOP, as determined from the mapping information in the intermediate entry in which the IP is identified, are supplied to the execution unit. In this manner, if an execution sequence starts from an intermediate instruction in an existing UC Line, then the existing UC Line may be used to supply the UOPs rather than allocating a new UC Line with that instruction as the first instruction. In other words, a UC Line can be indexed by the IP of any instruction included in the UC Line and, thus, may be considered to be multi-indexed (and, therefore, the UC supporting such multiple indexing may be referred to as an MI-UC).

Figure 11:
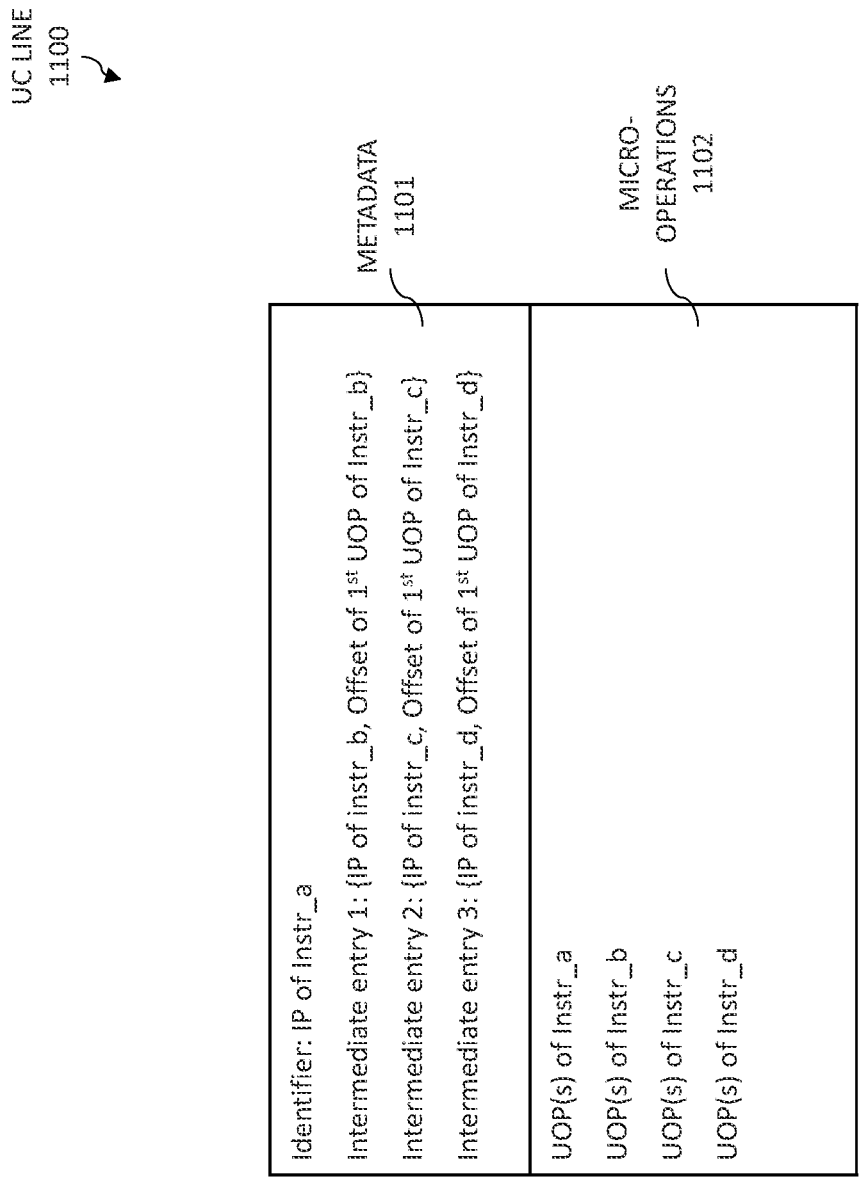
FIG. 11 depicts an example embodiment of a UC line of a multi-indexed micro-operations cache for illustrating intermediate entries configured to support identification of micro-operations for intermediate instructions of the UC line.

It will be appreciated that various aspects of an MI-UC may be further understood by considering an example UC line of an MI-UC, as presented with respect to FIG. 11 (generally) and FIGS. 12A-12E (more specifically for the example program of FIG. 6).

FIG. 11 depicts an example embodiment of a UC line of a multi-indexed micro-operations cache for illustrating intermediate entries configured to support identification of micro-operations for intermediate instructions of the UC line.

In FIG. 11, the UC line 1100 includes metadata 1101 and micro-operations 1102. The micro-operations 1102 of UC line 1110 includes UOPs of four instructions denoted as Instr_a, Instr_b, Instr_c, and Instr_d. The UC line 1100 is identified by the IP of Instr_a (the first instruction), which is stored in the metadata 1101 of UC line 1100. The metadata 1101 of UC line 1100 also includes three intermediate entries for the three intermediate instructions Instr_b, Instr_c, and Instr_d. For example, intermediate entry 1 encodes the mapping of the IP of Instr_b to the offset of its first UOP in the UC line 1100, intermediate entry 2 encodes the mapping of the IP of Instr_c to the offset of its first UOP in the UC line 1100, and intermediate entry 3 encodes the mapping of the IP of Instr_d to the offset of its first UOP in the UC line 1100.

FIGS. 12A-12E depict example embodiments of UC lines in an MI-UC for the program of FIG. 6.

In FIGS. 12A-12E, the construction of the UC lines in the MI-UC, as the instructions of program 600 of FIG. 6 are fetched and decoded by the processor, is depicted.

The processor starts execution from Instr_1. It is assumed that, at this point, there are no valid cache lines in the MI-UC (i.e., the MI-UC is empty). Since no UC Line is found for the IP of Instr_1, the processor starts fetching and decoding from Instr_1 and allocates a new UC Line for storing the decoded UOPs. IP of Instr_1 is the identifier of the UC Line. The unconditional jump instruction jump_100 switches the execution sequence to start from Instr_100. So, the instructions in the sequence of instructions from Instr_1 to jump_100 are decoded and stored in the new UC Line, referred to as UC Line 1. UC Line 1 is identified by the IP of Instr_1. When Instr_2 is decoded and stored in the UC Line 1, its IP is added into the intermediate entry 1 wherein the IP maps to the offset of the first UOP of Instr_2 in the UC Line 1. When Instr_3 is decoded and stored in the UC Line 1, its IP is added into intermediate entry 2 wherein the IP maps to the offset of first UOP of Instr_3 in the UC Line 1. When jump_100 is decoded and stored in the UC Line 1, its IP is added into intermediate entry 3 wherein the IP maps to the offset of the first UOP of jump_100 in the UC Line 1. The UC Line 1 is depicted in FIG. 12A.

The processor, after jump_100, starts execution from Instr_100. Since no UC Line is found for the IP of Instr_100, the processor starts fetching and decoding from Instr_100 and allocates a new UC Line for storing the decoded UOPs. After decoding Instr_103, the UC Line is full. The instructions in the sequence from Instr_100 to Instr_103 are decoded and stored in the new UC Line, referred to as UC Line 2. UC Line 2 is identified by the IP of Instr_100. UC Line 2 contains three intermediate instructions, the Instr_101, Instr_102 and Instr_103. So, intermediate entries are encoded in the UC Line for Instr_101, Instr_102, and Instr_103, respectively. The UC Line 2 is depicted in FIG. 12B.

The processor then starts execution from Instr_104. Since no UC Line is found for the IP of Instr_104, the processor starts fetching and decoding from Instr_104 and allocates a new UC Line for storing the decoded UOPs. After decoding jump_25, the processor switches the execution sequence to start from Instr_25. So, the instruction in the sequence from Instr_104 to jump_25 are decoded and stored in the new UC Line, referred to as UC Line 3. UC Line 3 is identified by IP of Instr_104. UC Line 3 contains two intermediate instructions, Instr_105 and jump_25. So, intermediate entries are encoded in the UC Line for Instr_105 and jump_25, respectively. The UC Line 3 is depicted in FIG. 12C.

The processor then starts execution from Instr_25. Since no UC line is found for the IP of Instr_25, the processor starts fetching and decoding from Instr_25 and allocates a new UC line for storing the decoded UOPs. After decoding jump_102, the processor switches the execution sequence to start from Instr_102. So, the instructions of the sequence from Instr_25 to jump_102 are decoded and stored in the new UC line, referred to as UC Line 4. UC Line 4 is identified by IP of Instr_25. UC Line 4 contains three intermediate instructions, the Instr_26, Instr_27, and jump_102. So, intermediate entries are encoded in the UC line for Instr_26, Instr_27, and jump_102, respectively. The UC Line 4 is depicted in FIG. 12D.

The processor then starts execution from Instr_102. Since no UC line is found for the IP of Instr_102, the processor looks up the IP in the intermediate entries of a UC line. In UC Line 2, the intermediate entry 2 is hit, which maps to the offset of the first UOP of Instr_102 in UC Line 2. So, all UOPs in the UC Line 2 after the offset are supplied to the execution unit. Then the processor starts execution from Instr_104. UC Line 3 already exists with IP of Instr_104 as its identifier. So, all UOPs from the UC Line 3 are supplied to the execution unit. The last UOP in UC Line 3, switches the execution sequence to start from Instr_25. The processor already finds the UC Line 4 identified by IP of Instr_25, so the entire UC Line 4 is directly supplied to the execution unit.

Now, assume that the processor starts executing another instruction sequence starting at instruction Instr_200. Since no UC line is found for the IP of Target_200, the processor starts fetching and decoding from Instr_200 and allocates a new UC line for storing the decoded UOPs. After decoding jump_103, the processor switches the execution sequence to start from Instr_103. So, the instructions in the sequence of instructions from Instr_200 to jump_103 are decoded and stored in the new UC line, referred to as UC Line 5. UC Line 5 is identified by IP of Instr_200. UC Line 5 contains two intermediate instructions, the Instr_201 and jump_103. So, intermediate entries are encoded in the UC line for Instr_201 and jump_103. The UC Line 5 is depicted in FIG. 12E.

The processor then start execution from Instr_103. Since no UC line is found for the IP of Instr_103, the processor looks up the IP in intermediate entries of a UC line. In UC Line 2, a lookup in intermediate entries identifies the intermediate entry 3, which maps to the offset of the first UOP of Instr_103 in UC Line 2. So, all UOPs in the UC Line 2 after the offset are supplied to the execution unit. Then the processor starts execution from Instr_104. UC Line 3 already exists with IP of Instr_104 as its identifier. So, all UOPs from the UC Line 3 are supplied to the execution unit.

As may be seen from the example above, no overlap exists among UC lines and the UC is used optimally in delivering UOPs to the execution unit.

Figure 13:
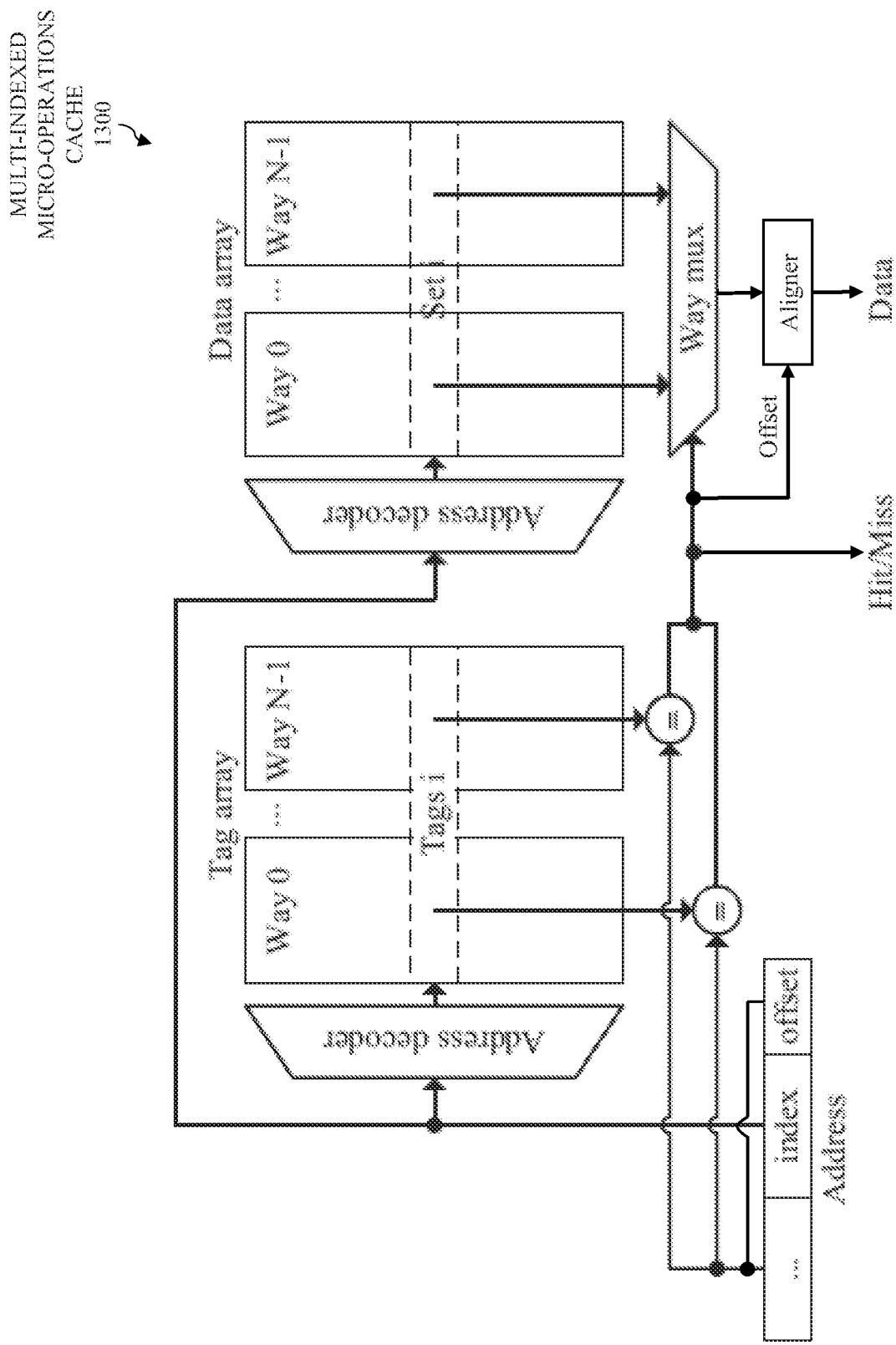
FIG. 13 depicts an example embodiment of a multi-indexed micro-operations cache that is organized as an N-way set associative cache.

FIG. 13 depicts an example embodiment of a multi-indexed micro-operations cache that is organized as an N-way set associative cache.

As illustrated in FIG. 13, the MI-UC 1300 includes two main building blocks: the tag array and the data array.

The Tag Array is a N-way set associative array in which each entry includes the IP of a UC line, its validity, its size (i.e., IP of the last instruction in the UC line—IP of first instruction in the UC line), intermediate entries, and so forth.

The Data Array is a N-way set associative array in which an entry includes the UC line that corresponds to the entry in Tag Array.

In the MI-UC 1300, the processor first looks up the Tag Array by the IP of an instruction and, if Tag Array is hit then the corresponding entry in the Data Array supplies all the UOPs in the UC line to the execution unit.

Figure 14A:
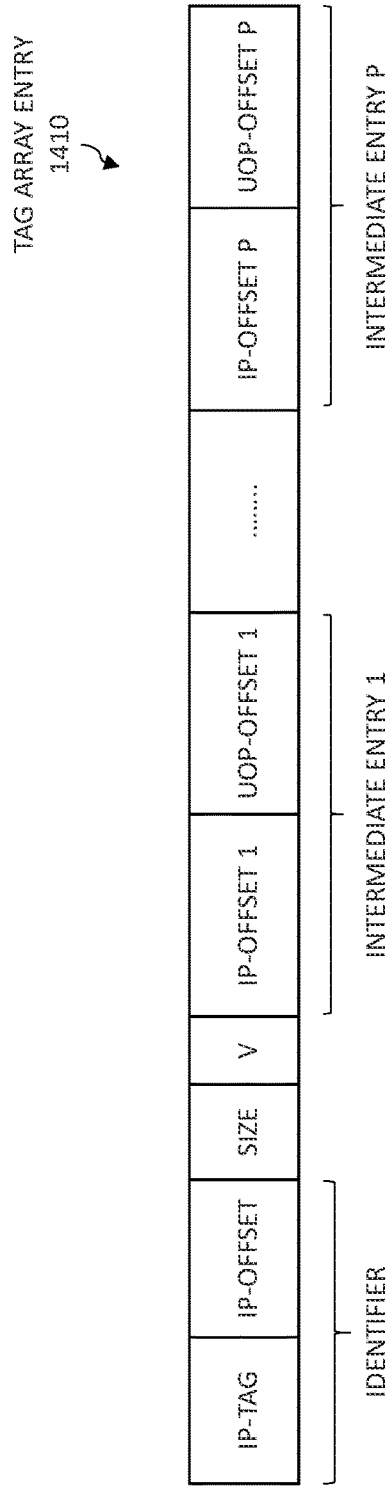
FIGS. 14A and 14B depict example embodiments of a Tag Array entry and a Data Array entry in an MI-UC.
Figure 14B:
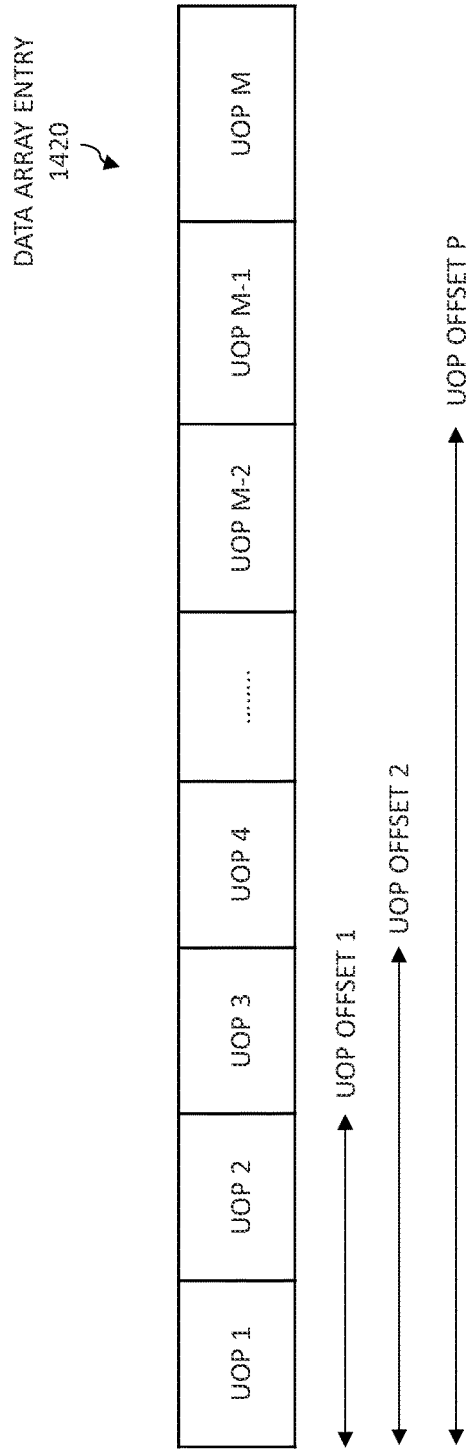

FIGS. 14A and 14B depict example embodiments of a Tag Array entry and a Data Array entry in an MI-UC.

FIG. 14A depicts the Tag Array entry 1410 associated with the Data Array entry 1420 of FIG. 14B. The Tag Array entry 1410 includes an IP-Tag field, an IP-Offset field, a Size field, a V field, and P Intermediate entries. The tuple {IP-Tag, IP-Offset} in the Tag Array entry 1410 is denoted as the "Identifier" of the Tag Array entry 1410 since the tuple is part of the Identifier/IP of the UC line. It will be appreciated that, since the Tag Array entry 1410 has slots for P number of Intermediate entries for P intermediate instructions having sets of micro-operations stored in the Data Array 1420, this means that the UC line can accommodate up to a maximum of P+1 instructions (the first instruction associated with the tuple {IP-Tag, IP-Offset} plus the P intermediate instructions). The IP-Tag is common for all instructions included in the UC line, so the IP of an intermediate instruction in an Intermediate entry may be encoded by its IP-Offset field alone. An Intermediate entry for an intermediate instruction also encodes a location of a first UOP of the set of UOPs stored in the UC line for the intermediate instruction. Accordingly, for an intermediate instruction having a set of UOPs stored in the UC line, the intermediate entry encoded in the Tag Array entry 1410 for the intermediate instruction may be encoded by the tuple {IP-Offset, UOP-Offset}, where the combination of the IP-Tag at the beginning of the Tag Array entry 1410 and the IP-Offset of the intermediate instruction in the Intermediate entry identifies the intermediate instruction and the UOP-Offset is the offset of the first UOP of the intermediate instruction in the UC line (e.g., the offset from the beginning of the Data Array entry 1420 to the start of the first UOP of the set of UOPs stored in the UC line based on decoding of the intermediate instruction). An example usage of the UOP-Offsets from the Intermediate entries of the Tag array entry 1410 in the Data Array entry 1420 is illustrated in FIG. 14B.

FIG. 14B depicts the Data Array entry 1420 associated with the Tag Array entry 1410 of FIG. 14A. The Data Array entry 1420 holds the UOPs of the instructions included by the UC line. There are a total of M number of UOPs in the exemplary Data Array entry 1420, where the M number of UOPs includes UOPs for P sets of UOPs associated with P instructions. The first instruction of the UC line, which is associated with the IP-Tag field and an IP-Offset field of the Tag Array entry 1410, decodes to two UOPs which are UOP 1 and UOP 2 in the Data Array entry 1420. The second instruction of the UC line (which is the second instruction of the UC line and the first intermediate instruction of the UC line), which is associated with Intermediate Entry 1 (including the IP-Offset 1 and UOP-Offset 1) of the Tag Array entry 1410, decodes to one UOP which is UOP 3 in the Data Array entry 1420 (and, thus, the value of the UOP-Offset 1 in the Intermediate Entry 1 of the Tag Array entry 1410 for the this instruction is set to 2). The final instruction of the UC line (which is the (P+1)th instruction of the UC line and the P-th intermediate instruction of the UC line), which is associated with Intermediate Entry P (including the IP-Offset P and UOP-Offset P) of the Tag Array entry 1410, decodes to two UOPs which are UOP M-1 and UOP M in the Data Array entry 1420 (and, thus, the value of the UOP-Offset P in the Intermediate Entry P of the Tag Array entry 1410 for the this instruction is set to UOP M-2).

In an MI-UC including a Tag Array entry similar to Tag Array entry 1410 and a Data Array entry similar to the Data Array entry 1420, the Tag Array entry and the Data Array entry may be used, when decoding instructions and when looking up instructions, for providing improved operation of the associated UC such that a new UC line does not need to be allocated when an execution sequence starts from an instruction in the middle of an existing UC line.

For example, when an instruction is decoded and stored in a UC line and the instruction is an intermediate instruction in the UC line, an intermediate entry is encoded into the next empty slot in the Tag Array entry for the IP of the instruction.

For example, when an IP is looked up in the Tag Array and it does not match the IP of any entry (i.e., the IP-Tag and IP-Offset in a way) but the IP is within the range of an entry (i.e., between IP-Offset and {IP-Offset+Size} of a way) then the IP is looked up among the intermediate entries. If an intermediate entry is a hit then all UOPs in the UC line after the UOP-Offset are supplied to the execution unit. In this way, if an execution sequence starts from an intermediate instruction in an existing UC line then the same UC line is used to supply the UOPs rather than allocating a new UC line with that instruction as the first instruction.

In the MI-UC, there is an additional output from Tag Array which is shown depicted in FIG. 13 as "Offset". The Offset output from the matching way indicates the offset of the first UOPs of the input IP in the UC line (Data). If the IP is the identifier of the UC line, then Offset value is 0. The Aligner of the MI-UC picks up the UOPs from an offset (specified by Offset output) in the UC line. At clock cycle T, the IP-Index of an instruction (denoted as IP-1 for purposes of clarity) is input into Address Decoders of the Tag Array and the Data Array in parallel. The Address Decoder of Tag Array selects all ways of the set corresponding to the IP-Index of IP-1. The Address Decoder of Data Array selects all ways of the set corresponding to the IP-Index of IP-1. Operations are then performed on each way of the selected set in the Tag Array in order to identify the set of UOPs for IP-1 and supply the set of UOPs for IP-1 to the execution unit.

The operations on each way of the selected set in Tag Array can be implemented with either of two approaches discussed further below.

This is a first approach for the operations on each way of the selected set in Tag Array. In a first step, the {IP-Tag, IP-Offset} of IP-1 is compared against the Identifier {IP-Tag, IP-Offset} of the way. If the comparison of the first step results in a match, then the following outputs are generated and the procedure terminates: (1) Hit as "1" and (2) Offset as "0". If the comparison of the first step does not result in a match, then a second step is performed. In the second step, a determination is made as to whether IP-1 is greater than the IP of the way but less than (IP of the way+size). If the condition of the second step is false, then the following outputs are generated and the procedure terminates: (1) Hit as "0" and (2) Offset as "invalid". If the condition of the second step is true, then a third step is performed. In the third step, the IP-Offset of IP-1 is compared with the IP-Offsets of each of the intermediate entries in parallel. Here, one of the intermediate entries must match and the following outputs are generated: (1) Hit as "1" (on the matching intermediate entry) and (2) Offset as the UOP-Offset of the matching intermediate entry. It is noted that this first approach may be considered to be optimal from a power consumption point of view since intermediate entries are looked up only if the IP-Tag and the IP-Offset of IP-1 do not match the IP-Tag and the IP-Offset of the Tag Entry (i.e., the first and second steps discussed above are staged after the first step discussed above). The implementation ensures that all three steps are completed in the same clock cycle.

This is a second approach for the operations on each way of the selected set in Tag Array. In a first step, the {IP-Tag, IP-Offset} of IP-1 is compared against the Identifier {IP-Tag, IP-Offset} of the way. In a second step, the IP-Offset of IP-1 is compared with the IP-Offsets of each of the intermediate entries in parallel. The first step and the second step are performed in parallel. If IP-1 is not a match in the first and second steps, then the following outputs are generated and the procedure terminates: (1) Hit as "0" and (2) Offset as "invalid". If the IP-1 is a match in the first step or the second step, then generate the following outputs and the procedure terminates: (1) Hit as "1" and (2) if IP-1 is a match in the first step then the Offset is set to "0" and if the IP-1 is a match in the second step then the Offset is set as the value of the UOP-Offset of the matching intermediate entry. As indicated above, in this second approach the matching of IP-Offset of IP-1 with the corresponding field of intermediate entries is performed in parallel with the matching of IP-Tag and IP-Offset of IP-1 with the identifier field, which ensures that all four of the steps complete in the same clock cycle. This second approach is suitable when the die area consumed by a Tag Entry is small enough to avoid significant cost on power budget due to parallel comparison.

In either of the approaches above, at the end of clock cycle T, the UC delivers the following two outputs. The Tag Array delivers: (1) whether IP-1 is a hit or a miss in the UC, (2) the way number if IP-1 is a hit, and (3) the Offset in IP-1 in the way if IP-1 is a hit. The Data Array delivers: all UC lines in the set are read and input into a way multiplexer. The way number from output (2) from the Tag Array is input into the way multiplexer, which selects the Data from the appropriate UC line. The selected Data and the Offset from output (3) from the Tag array are then input to an Aligner. The Aligner reads the Data from the Offset (i.e., the UOPs from the Offset) and sends as the Data as the output.

Figure 15:
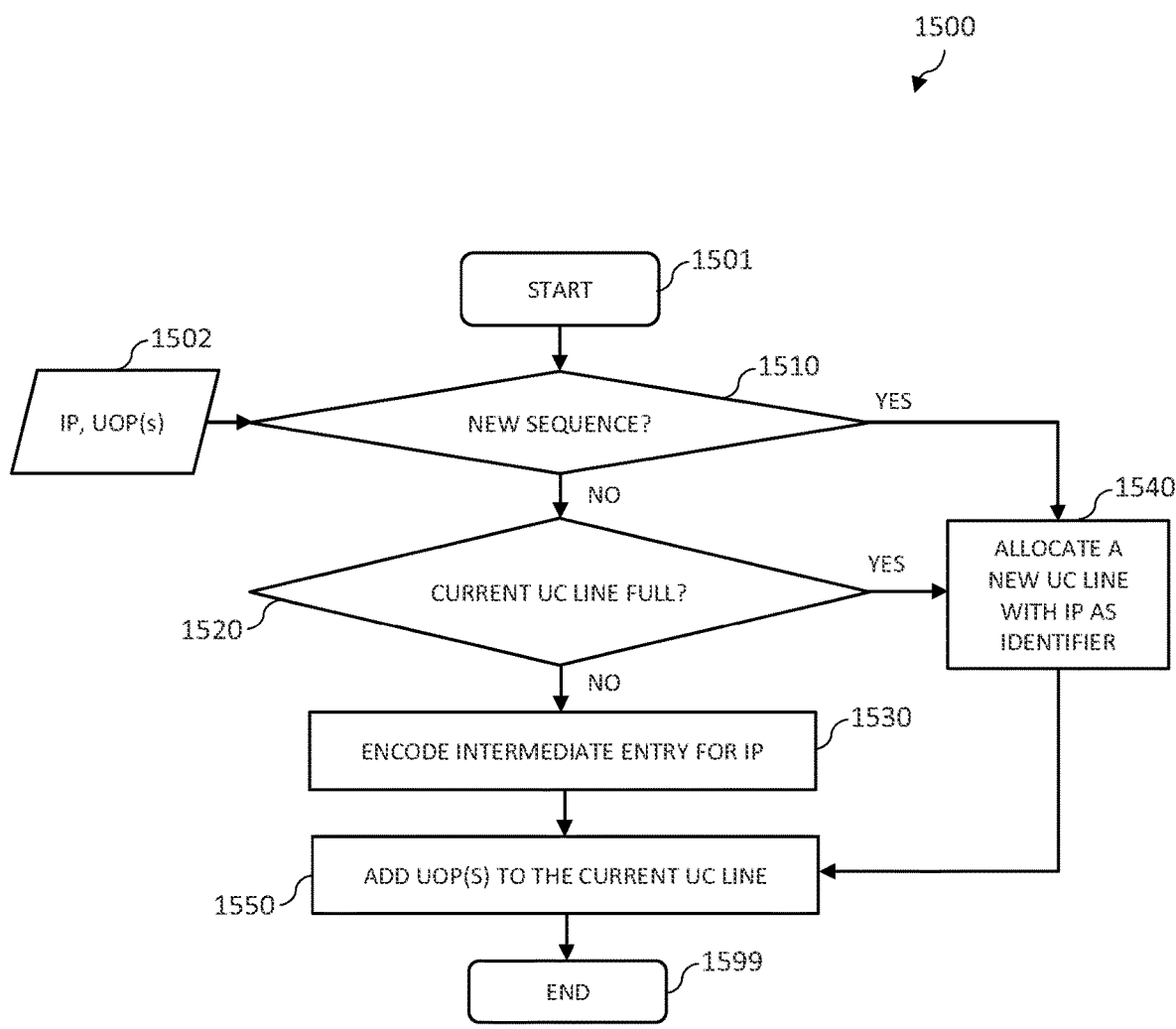
FIG. 15 depicts an example embodiment of a method for implementing a write operation to a multi-indexed micro-operations cache.

FIG. 15 depicts an example embodiment of a method for implementing a write operation to a multi-indexed micro-operations cache. The implementation of the write operation to the MI-UC results in storing of UOPs of an instruction after the decode stage generated UOPs of the instruction. It will be appreciated that, although primarily presented as being performed serially, at least a portion of the blocks of method 1500 may be performed contemporaneously or in a different order than as presented in FIG. 15. At block 1501, the method 1500 begins. The inputs to the method, as indicated at block 1502, include the IP of an instruction and one or more UOPs of the decoded instruction. Block 1510 determines whether the instruction is the beginning of a new sequence. If the instruction is not the beginning of a new sequence then the method 1500 proceeds to block 1520, otherwise the method 1500 proceeds to block 1540. Block 1520 checks if current UC line is full. The current UC line means the UC line wherein UOPs of previous instructions in the sequence had been stored. If the UC line is not full then the method 1500 proceeds to block 1530, otherwise the method 1500 proceeds to block 1540. Block 1540 allocates a new UC line in the UC with IP of the instruction as the identifier of the UC line and makes it the current UC line, and the method 1500 then proceeds to block 1550. Block 1530 adds an intermediate entry in the UC line with the IP of the instruction since this is an intermediate instruction for the current UC line. The entry maps to the offset of the first UOP of the instruction in the UC line. From block 1530, the method proceeds to block 1550. Block 1550 appends the UOP(s) of the instruction into the current UC line. From block 1550, the method 1500 proceeds to block 1599 where the method 1500 ends.

Figure 16:
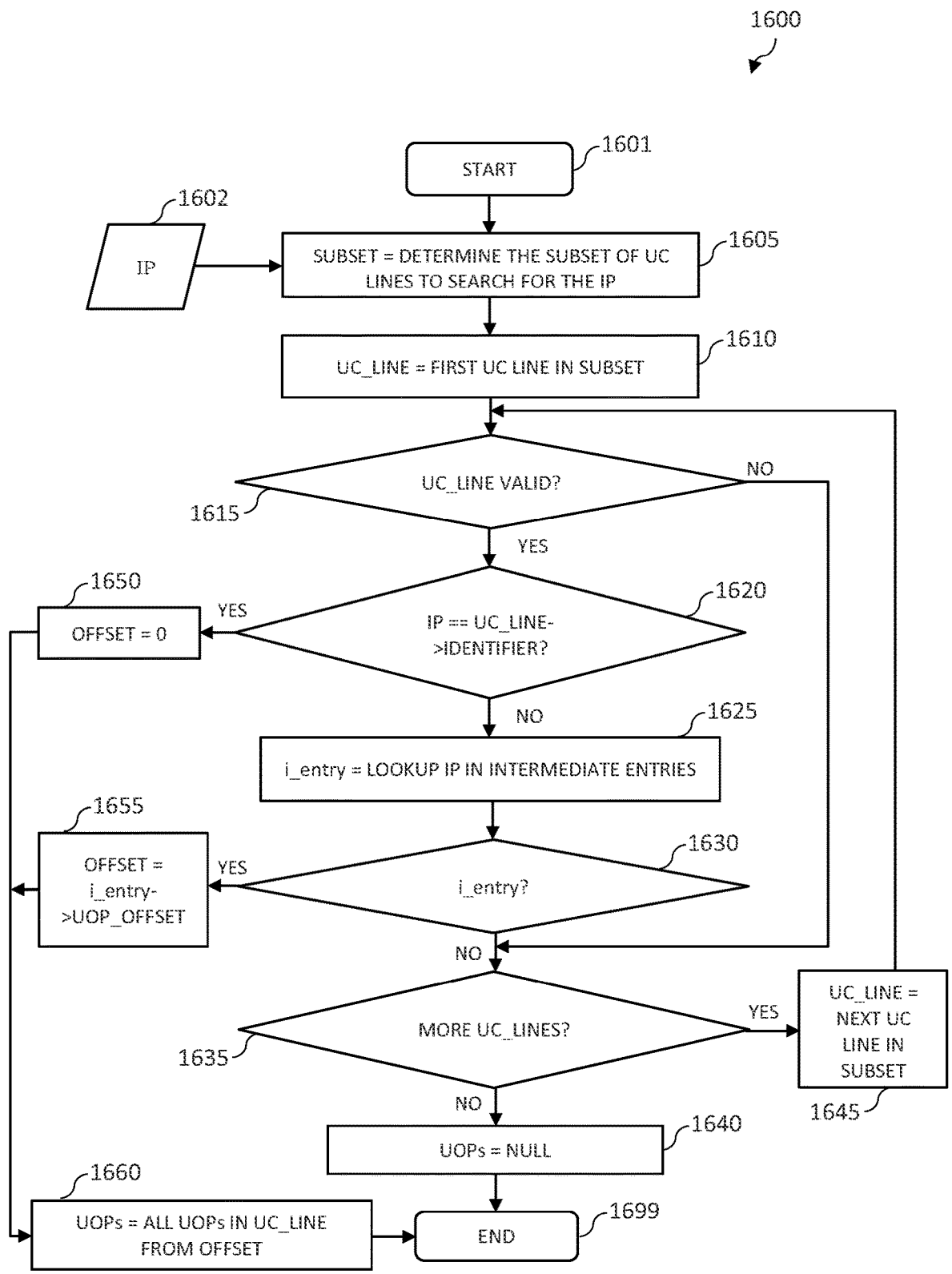
FIG. 16 depicts an example embodiment of a method for implementing a read operation in a multi-indexed micro-operations cache.

FIG. 16 depicts an example embodiment of a method for implementing a read operation in a multi-indexed micro-operations cache. The implementation of the read operation to in MI-UC performs a lookup of UOPs for the sequence starting with an IP. It will be appreciated that, although primarily presented as being performed serially, at least a portion of the blocks of method 1600 may be performed contemporaneously or in a different order than as presented in FIG. 16. At block 1601, the method 1600 begins. The inputs to the method, as indicated at block 1602, include the IP of an instruction to be looked up in the MI-UC. Block 1605 finds the subset of UC lines that may store UC lines for the IP. For example, when MI-UC is implemented as an N-way set associative array, the subset consists of the ways in the set indexed by IP-Index portion of the IP. From block 1605, the method 1600 proceeds to block 1610. Block 1610 retrieves the first UC line in the subset and the method 1600 then proceeds to block 1615. Block 1615 checks if the UC line is valid. If the UC line is not valid then the method 1600 proceeds to block 1635, otherwise the method 1600 proceeds to block 1620. Block 1620 checks if the IP is the identifier of the UC line. If the IP is the identifier of the UC line then the method 1600 proceeds to block 1650, otherwise the method 1600 proceeds to block 1625. Block 1650 sets the offset of UOPs to be read from the UC line as 0 since the IP exactly matches the identifier of the UC line, and then the method 1600 proceeds to block 1660. Block 1660 reads all UOPs from the specified offset of the UC line, and then the method 1600 proceeds to block 1699 where the method 1600 ends. Block 1625 looks up the IP among the intermediate entries in the UC line since the IP does not match the identifier of the UC line, and the method 1600 then proceeds to block 1630. Block 1630 checks if the IP matches an intermediate entry. If the IP does not match an intermediate entry then the method 1600 proceeds to block 1635, otherwise the method 1600 proceeds to block 1655. Block 1655 sets the offset of the UOPs to be read from the UC line as the offset configured in the intermediate entry, which is the offset of the first UOP of the instruction (pointed by the IP) in the UC line, and then the method 1600 proceeds to block 1660. Block 1660 reads all UOPs from the specified offset of the UC line, and then the method 1600 proceeds to block 1699 where the method 1600 ends. Block 1635 checks if there are more UC lines to be processed in the subset of UC lines. If there are no more UC lines to be processed in the subset of UC lines then the method 1600 proceeds to block 1640, otherwise the method 1600 proceeds to block 1645. Block 1640 declares a failure to lookup the UOPs for the IP and then the method 1600 proceeds to block 1699 where the method 1600 ends. Block 1645 retrieves the next UC line in the subset of UC lines and the method 1600 then returns to block 1615 to repeat the subsequent steps for the next UC line. At block 1699, the method 1600 ends. It will be appreciated that some of the blocks of 1699 may be executed in parallel (e.g., in the case of the second approach discussed above, blocks 1620-1630 may be executed in parallel).

Figure 17:
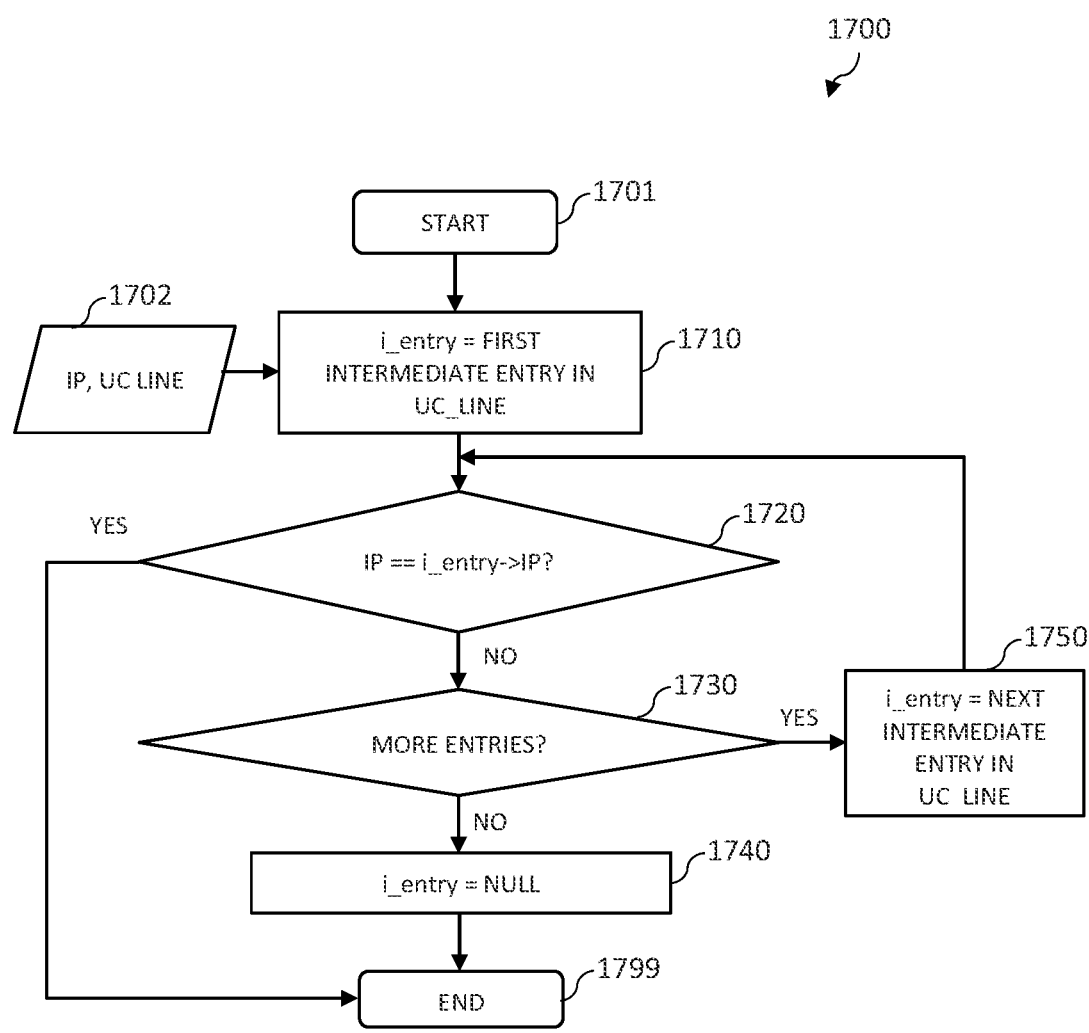
FIG. 17 depicts an example embodiment of a method for performing a lookup for an IP in intermediate entries of a micro-operations line in a multi-indexed micro-operations cache.

FIG. 17 depicts an example embodiment of a method for performing a lookup for an IP in intermediate entries of a micro-operations line in a multi-indexed micro-operations cache. It will be appreciated that the method 1700 of FIG. 17 may be used to provide block 1625 of the method 1600 of FIG. 16. It will be appreciated that, although primarily presented as being performed serially, at least a portion of the blocks of method 1700 may be performed contemporaneously or in a different order than as presented in FIG. 17. At block 1701, the method 1700 begins. The inputs to the method, as indicated at block 1702, include: (1) the IP to be looked up among intermediate entries of a UC line and (2) the UC line. Block 1710 retrieves the first intermediate entry in the UC line, and the method 1700 then proceeds to block 1720. Block 1720 checks if the input IP matches the IP of the intermediate entry. If the input IP matches the IP of the intermediate entry then this is the entry to be returned and the method 1700 proceeds to block 1799 where the method 1700 ends, otherwise the method 1700 proceeds to block 1730. Block 1730 checks if there are more intermediate entries in the UC line. If there are no more intermediate entries in the UC line then the method proceeds to block 1740, otherwise the method 1700 proceeds to block 1750. Block 1740 declares a failure to match an intermediate entry, and then the method 1700 proceeds to block 1799 where the method 1700 ends. Block 1750 retrieves the next intermediate entry in the UC line and the method 1700 then returns to block 1720 to repeat the subsequent steps for the next intermediate entry. At block 1799, the method 1700 ends.

Figure 18:
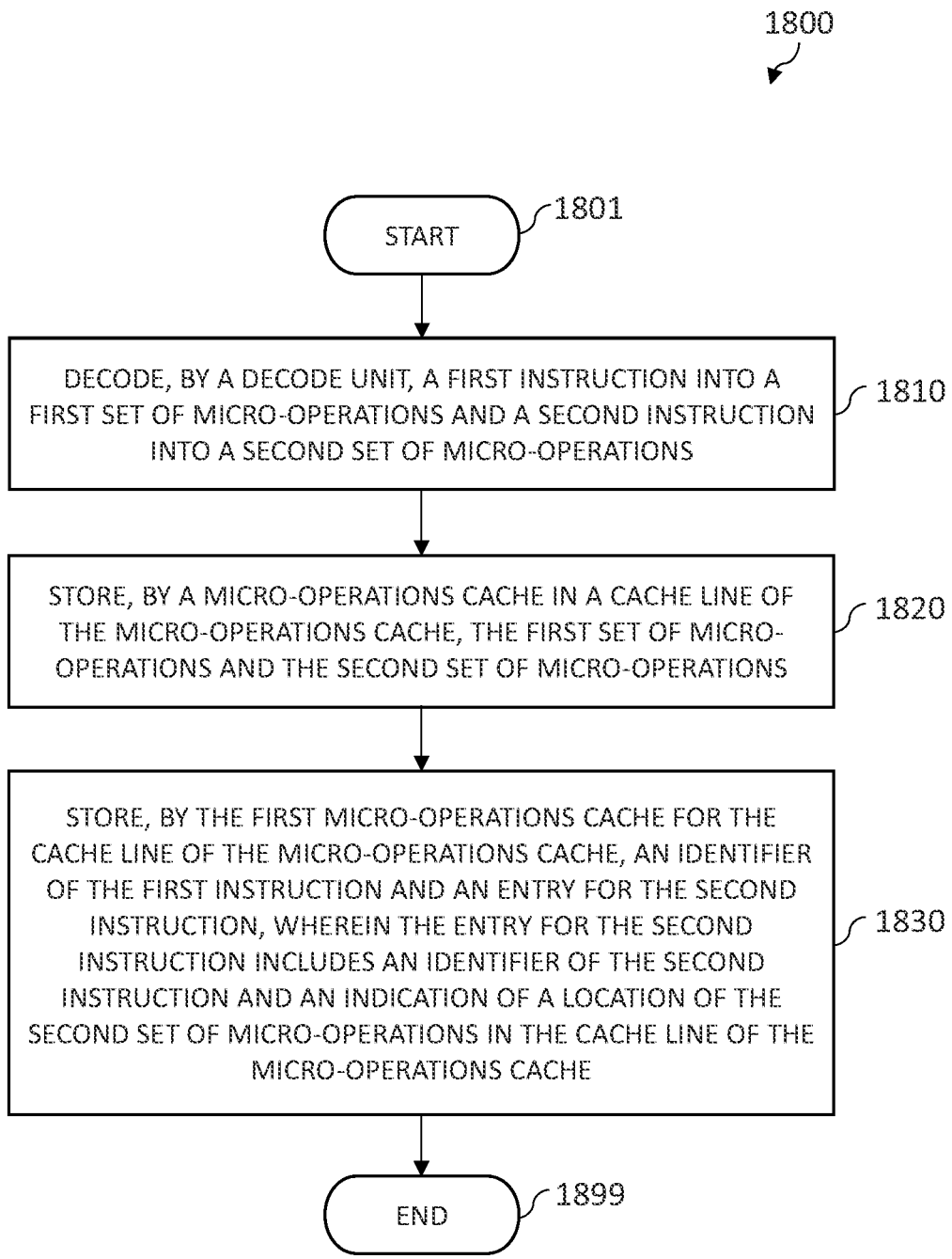
FIG. 18 depicts an example embodiment of a method for operating a multi-indexed micro-operations cache.

FIG. 18 depicts an example embodiment of a method for operating a multi-indexed micro-operations cache. It will be appreciated that, although primarily presented herein as being performed serially, at least a portion of the functions of method 1800 may be performed contemporaneously or in a different order than as presented in FIG. 18. At block 1801, the method 1800 begins. At block 1810, decode, by a decode unit, a first instruction into a first set of micro-operations and a second instruction into a second set of micro-operations. At block 1820, store, by a micro-operations cache in a cache line of the micro-operations cache, the first set of micro-operations and the second set of micro-operations. At block 1830, store, by the first micro-operations cache for the cache line of the micro-operations cache, an identifier of the first instruction and an entry for the second instruction, wherein the entry for the second instruction includes an identifier of the second instruction and an indication of a location of the second set of micro-operations in the cache line of the micro-operations cache. At block 1899, the method 1800 ends.

Figure 19:
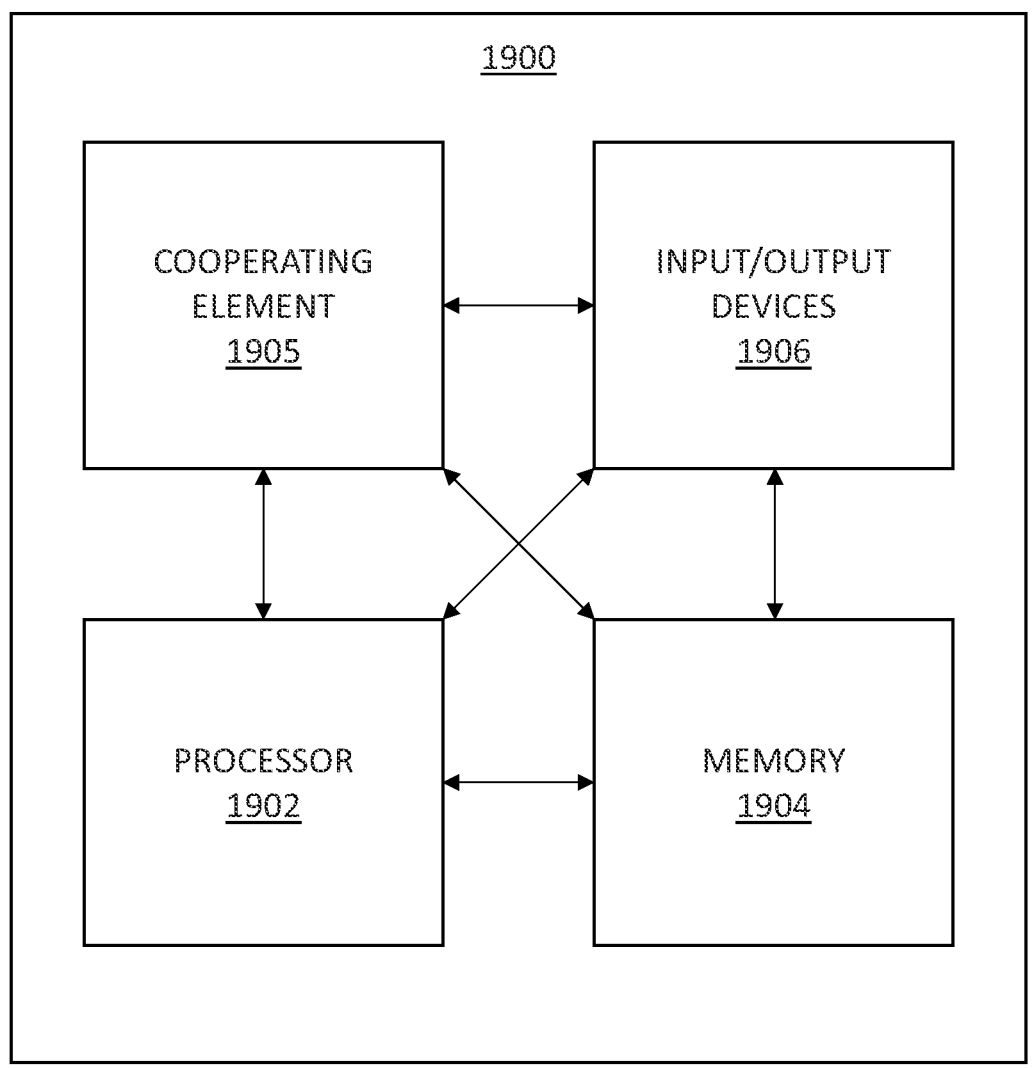
FIG. 19 depicts an example embodiment of a computer suitable for use in performing various functions presented herein.

FIG. 19 depicts an example embodiment of a computer suitable for use in performing various functions presented herein.

The computer 1900 includes a processor 1902 (e.g., a central processing unit (CPU), a processor, a processor having a set of processor cores, a processor core of a processor, or the like) and a memory 1904 (e.g., a random access memory, a read only memory, or the like). The processor 1902 and the memory 1904 may be communicatively connected. In at least some example embodiments, the computer 1900 may include at least one processor and at least one memory including computer program code, wherein the at least one memory and the computer program code are configured to, with the at least one processor, cause the computer to perform various functions presented herein.

The computer 1900 also may include a cooperating element 1905. The cooperating element 1905 may be a hardware device. The cooperating element 1905 may be a process that can be loaded into the memory 1904 and executed by the processor 1902 to implement various functions presented herein (in which case, for example, the cooperating element 1905 (including associated data structures) can be stored on a non-transitory computer-readable storage medium, such as a storage device or other suitable type of storage element (e.g., a magnetic drive, an optical drive, or the like)).

The computer 1900 also may include one or more input/output devices 1906. The input/output devices 1906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1900 may represent a general architecture and functionality suitable for implementing functional elements described herein, portions of functional elements described herein, or the like, as well as various combinations thereof. For example, computer 1900 may provide a general architecture and functionality that is suitable for implementing one or more elements presented herein.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
 a decode unit configured to decode a plurality of instructions of a program to form a respective plurality of sets of micro-operations; and
 a micro-operations cache configured to:
  store, in a cache line of the micro-operations cache, the plurality of sets of micro-operations; and store, for the cache line of the micro-operations cache, a set of entries including:
  for a first instruction in the plurality of instructions of the program for which the respective set of micro-operations is stored at a beginning of the cache line of the micro-operations cache, a first entry including an identifier of the first instruction, wherein the identifier of the first instruction includes an instruction pointer tag for the first instruction and an instruction pointer offset for the first instruction; and
  for each instruction in the plurality of instructions of the program other than the first instruction, a respective entry including an identifier of the respective instruction and a micro-operation offset for the respective instruction, wherein the identifier of the respective instruction is an instruction pointer offset for the respective instruction and wherein the micro-operation offset for the respective instruction is indicative of a location of the respective set of micro-operations of the respective instruction in the cache line of the micro-operations cache.

2. The apparatus of claim 1, wherein the set of entries is stored in the cache line of the micro-operations cache.

3. The apparatus of claim 1, wherein the set of entries is stored as part of a set of metadata stored in the cache line of the micro-operations cache.

4. The apparatus of claim 1, wherein the micro-operation offset for the respective instruction specifies an offset from the beginning of the cache line to a first micro-operation in the respective set of micro-operations of the respective instruction.

5. The apparatus of claim 1, wherein the plurality of sets of micro-operations are stored in a data array entry of a data array of the micro-operations cache.

6. The apparatus of claim 1, wherein the set of entries is stored in a tag array entry of a tag array of the micro-operations cache.

7. The apparatus of claim 1, wherein the micro-operations cache is configured to:
  compare an identifier of a given instruction of the set of instructions with an identifier of a tag array entry of a tag array;
  perform, based on a determination that the identifier of the given instruction and the identifier of the tag array entry do not match but that the identifier of the given instruction is within range of a set of intermediate entries of the tag array entry, a lookup of an instruction offset portion of the identifier of the given instruction in each of the intermediate entries of the tag array entry in parallel; and
  provide, from one of the intermediate entries of the tag array entry based on a determination that the instruction offset portion of the identifier of the given instruction matches the one of the intermediate entries of the tag array entry, the indication of the location of the respective set of micro-operations of the given instruction in the cache line of the micro-operations cache.

8. The apparatus of claim 1, wherein the micro-operations cache is configured to:
  compare an identifier of a given instruction of the set of instructions with an identifier of a tag array entry of a tag array and compare an instruction offset portion of the identifier of the given instruction against a set of intermediate entries of the tag array entry in parallel; and
  provide, from one of the intermediate entries of the tag array entry based on a determination that the offset portion of the identifier of the given instruction matches the one of the intermediate entries of the tag array entry, the indication of the location of the respective set of micro-operations of the given instruction in the cache line of the micro-operations cache.

9. The apparatus of claim 1, wherein the micro-operations cache is configured to:
  select, by an address decoder of a data array including a set of ways, each of the ways corresponding to an identifier of a given instruction of the set of instructions; and
  perform, on each of the selected ways in a tag array, a respective set of operations for attempting to retrieve the indication of the location of the respective set of micro-operations of the given instruction in the cache line of the micro-operations cache from the respective way in the tag array.

10. The apparatus of claim 9, wherein, to perform the respective set of operations for attempting to retrieve the indication of the location of the respective set of micro-operations in the cache line of the micro-operations cache from the respective way in the tag array, the micro-operations cache is configured to:
  compare the identifier of the given instruction against an identifier of the respective way in the tag array;
  determine, based on a determination that the identifier of the given instruction does not match the identifier of the respective way in the tag array, whether a condition for the respective way of the tag array is satisfied, wherein the condition for the respective way of the tag array is that the identifier of the given instruction is greater than the identifier of the respective way in the tag array but less than a sum of the identifier of the respective way in the tag array and a size of the respective way in the tag array;
  compare, based on a determination that the condition for the respective way of the tag array is satisfied, an instruction offset portion of the identifier of the given instruction against a set of intermediate entries of the tag array in parallel; and
  provide, from one of the intermediate entries of the tag array entry based on a determination that the instruction offset portion of the identifier of the given instruction matches the one of the intermediate entries of the tag array entry, the indication of the location of the respective set of micro-operations in the cache line of the micro-operations cache.

11. The apparatus of claim 9, wherein, to perform the respective set of operations for attempting to retrieve the indication of the location of the respective set of micro-operations in the cache line of the micro-operations cache from the respective way in the tag array, the micro-operations cache is configured to:
  compare, in parallel, the identifier of the given instruction against an identifier of the respective way in the tag array and an instruction offset portion of the identifier of the given instruction against a set of intermediate entries of the tag array in parallel; and
  provide, from one of the intermediate entries of the tag array entry based on a determination that the instruction offset portion of the identifier of the given instruction matches the one of the intermediate entries of the tag array entry, the indication of the location of the respective set of micro-operations in the cache line of the micro-operations cache.

12. The apparatus of claim 9, wherein the micro-operations cache is configured to:
provide, by the tag array based on a determination that the identifier of the given instruction is a hit in the micro-operations cache, a way number of one of the ways with which the given instruction is associated and the indication of the location of the respective set of micro-operations in the cache line of the micro-operations cache; and
provide, by the data array, data from a set of micro-operations lines in the one of the ways to a way multiplexer.

13. The apparatus of claim 12, wherein the micro-operations cache is configured to:
provide the way number of the one of the ways with which the given instruction is associated as an input into the way multiplexer; and
select, by the way multiplexer from the set of micro-operations lines in the one of the ways based on the way number, data from the cache line of the micro-operations cache.

14. The apparatus of claim 13, wherein the micro-operations cache is configured to:
provide, to an aligner, the data from the cache line of the micro-operations cache and the indication of the location of one of the sets of micro-operations in the cache line of the micro-operations cache; and
read, by the aligner from the data from the cache line of the micro-operations cache based on the indication of the location of the respective set of micro-operations in the cache line of the micro-operations cache, the respective set of micro-operations.

15. An apparatus, comprising:
a decode unit configured to decode a first instruction into a first set of micro-operations and a second instruction into a second set of micro-operations; and
a micro-operations cache configured to:
store, in a cache line of the micro-operations cache, the first set of micro-operations and the second set of micro-operations;
store, for the cache line of the micro-operations cache, an identifier of the first instruction and an entry for the second instruction, wherein the entry for the second instruction includes an identifier of the second instruction and an indication of a location of the second set of micro-operations in the cache line of the micro-operations cache;
compare the identifier of the second instruction with an identifier of a tag array entry of a tag array and compare an offset portion of the identifier of the second instruction against a set of intermediate entries of the tag array entry in parallel; and
provide, from one of the intermediate entries of the tag array entry based on a determination that the offset portion of the identifier of the second instruction matches the one of the intermediate entries of the tag array entry, the indication of the location of the second set of micro-operations in the cache line of the micro-operations cache.

16. An apparatus, comprising:
a decode unit configured to decode a plurality of instructions of a program to form a respective plurality of sets of micro-operations, wherein each of the instructions in the plurality of instructions of the program shares a common instruction pointer tag; and
a micro-operations cache configured to:
store, in a cache line of the micro-operations cache, the plurality of sets of micro-operations; and
store, for the cache line of the micro-operations cache, a set of entries including, for each instruction in the plurality of instructions of the program, a respective entry configured to support retrieval of the respective set of micro-operations of the respective instruction from the cache line of the micro-operations cache based on the respective instruction, wherein the respective entry comprises a respective instruction offset configured for use in matching the respective instruction and a respective micro-operation offset indicative of a location of the respective set of micro-operations of the respective instruction in the cache line of the micro-operations cache.

* * * * *